US008160143B2

(12) United States Patent
Sasai et al.

(10) Patent No.: US 8,160,143 B2
(45) Date of Patent: Apr. 17, 2012

(54) DECODING DEVICE, ENCODING DEVICE, INTERPOLATION FRAME CREATING SYSTEM, INTEGRATED CIRCUIT DEVICE, DECODING PROGRAM, AND ENCODING PROGRAM

(75) Inventors: Hisao Sasai, Osaka (JP); Satoshi Kondo, Kyoto (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 1364 days.

(21) Appl. No.: 10/587,939

(22) PCT Filed: Jan. 12, 2005

(86) PCT No.: PCT/JP2005/000250
§ 371 (c)(1),
(2), (4) Date: Aug. 2, 2006

(87) PCT Pub. No.: WO2005/076630
PCT Pub. Date: Aug. 18, 2005

(65) Prior Publication Data
US 2007/0127572 A1      Jun. 7, 2007

(30) Foreign Application Priority Data
Feb. 3, 2004   (JP) ................. 2004-026276

(51) Int. Cl.
*H04N 7/12* (2006.01)
*H04N 11/02* (2006.01)
*H04N 11/04* (2006.01)
*H04N 7/01* (2006.01)
*H04N 11/20* (2006.01)

(52) U.S. Cl. ............... 375/240.16; 375/240.02; 348/458

(58) Field of Classification Search ............. 375/240.16
See application file for complete search history.

(56) References Cited

U.S. PATENT DOCUMENTS
5,337,086 A      8/1994   Fujinami
(Continued)

FOREIGN PATENT DOCUMENTS
JP           5-115061         5/1993
(Continued)

OTHER PUBLICATIONS

Puri et al., "Video Coding with Motion-Compensated Intrepolation for CD-ROM Applications", Signal Processing Image Communication 2 (1990), No. 2, pp. 127-144.*

(Continued)

*Primary Examiner* — Christopher S Kelley
*Assistant Examiner* — Hee-Yong Kim
(74) *Attorney, Agent, or Firm* — Wenderoth, Lind & Ponack, L.L.P.

(57) ABSTRACT

The present invention is a decoding device, an encoding device, an interpolation frame creating system, an integrated circuit device, a decoding program and an encoding program capable of creating interpolation frames at a high precision with an improved encoding efficiency. The decoding device includes a decoding section, a motion vector detection section, and an interpolation frame creation section. The decoding section decodes an encoded image signal obtained by encoding image frames which form an image signal and additional information for creating an interpolation frame for interpolating the image frames based on a motion vector which is a motion vector between the image frames. The motion vector detection section detects a motion vector which is a motion vector between decoded image frames. The interpolation frame creation section creates an interpolation frame based on the motion vector, the decoded image frame, and the decoded additional information.

17 Claims, 16 Drawing Sheets

U.S. PATENT DOCUMENTS

| | | | |
|---|---|---|---|
| 5,796,438 A * | 8/1998 | Hosono | 348/458 |
| 2001/0012444 A1 | 8/2001 | Ito et al. | |
| 2002/0080875 A1 * | 6/2002 | Tahara et al. | 375/240.02 |

FOREIGN PATENT DOCUMENTS

| | | |
|---|---|---|
| JP | 7-177514 | 7/1995 |
| JP | 7-177519 | 7/1995 |
| JP | 8-256340 | 10/1996 |
| JP | 9-284777 | 10/1997 |
| JP | 10-56645 | 2/1998 |
| JP | 10-233996 | 9/1998 |
| JP | 2828096 | 9/1998 |
| JP | 2002-77789 | 3/2002 |

OTHER PUBLICATIONS

Supplementary European Search Report issued Aug. 18, 2009 in Application No. EP 05 70 3489.

F. J. de Bruijn et al., "Efficient Video Coding Integrating MPEG-2 and Picture-Rate Conversion", IEEE Transactions on Consumer Electronics, vol. 48, No. 3, Aug. 2002, pp. 688-693.

Byung-Tae Choi et al., "New Frame Rate Up-Conversion Using Bi-Directional Motion Estimation", IEEE Transactions on Consumer Electronics, vol. 46, No. 3, Aug. 2000, pp. 603-609.

Markus Flierl, "Generalized B Pictures and the Draft H.264/AVC Video-Compression Standard", IEEE Transactions on Circuits and Systems for Video Technology, vol. 13, No. 7, Jul. 2003, pp. 587-597.

* cited by examiner

| Profile | 1 | 2 | 3 | 4 |
|---|---|---|---|---|
| Interpolation method | ○ | ○ | ○ | ○ |
| Residual information | ○ | × | × | ○ |
| Vector difference | ○ | ○ | × | ○ |
| Motion detection method | Full search | 3step | 3step | OAT |

Fig.11

DECODING DEVICE, ENCODING DEVICE, INTERPOLATION FRAME CREATING SYSTEM, INTEGRATED CIRCUIT DEVICE, DECODING PROGRAM, AND ENCODING PROGRAM

BACKGROUND OF THE INVENTION

1. Field of Invention

The present invention relates to a decoding device, an encoding device, an interpolation frame creating system, an integrated circuit device, a decoding program and an encoding program, particularly to a decoding device, an encoding device, an interpolation frame creating system, an integrated circuit device, a decoding program and an encoding program for creating interpolation frames.

2. Description of the Related Art

For TVs, personal computers (PCs), cellular phones, and other types of apparatus displaying image signals, a technique for creating interpolation frames which interpolate image frames forming an image signal and displaying the created interpolation frames being inserted between the image frames is known. This technique is utilized for two different purposes: to display an image signal transmitted at a low frame rate to look smooth; and to encode and transmit an image signal at a low bit rate.

As one of the techniques intended for the former purpose, a technique to detect a motion vector between image frames and to create an interpolation frame using the obtained motion vector is known (see, for example, Japanese Laid-Open Publication No. 7-177514, FIG. 5).

More specifically, a motion vector between the image frames is detected, and the detected motion vector is divided internally or externally in the ratio between a distance in terms of time between the image frames and a distance in terms of time to an interpolation position of the interpolation frame. The derived motion vector (hereinafter, referred to as an interpolation motion vector) and pixel values of the image frames are used to create an interpolation frame.

A technique of transmitting pixel values of an image signal which correspond to an interpolation frame for a portion where a precision of interpolation using an interpolation motion vector is low in order to improve the precision of the interpolation frame is also known (see, for example, Japanese Patent Gazette No. 2828096).

As one of the techniques intended for the latter purpose, a technique called motion compensation encoding is known. Motion compensation encoding is encoding performed using motion vectors of image blocks which form an image frame. For example, in Moving Picture Experts Group (MPEG), which is an international standard for compression of moving picture signals, two encoding methods of intra-coding and inter-coding are used. Intra-coding is a method for encoding an image frame with only information within that frame. An image frame encoded with this method is called I frame. Inter-coding is a method for encoding an image frame using both information within that frame and information of other frames. An image frame encoded with this method is called P frame or B frame.

Specifically, motion compensation encoding intended for the latter purpose is a technique of encoding motion vectors between an interpolation frame (B frame) and image frames (I frames or P frames) which are positioned bidirectionally with respect to the interpolation frame in terms of time, and residual information of the interpolation frame and the image frames which are compensated with the motion vectors, as information for creating an interpolation frame. On a decoding end, an encoded image signal and image frames which have already been decoded are used to create an interpolation frame.

In this technical field, there is a demand for creating interpolation frames with a high precision while further improving encoding efficiency. Specifically, among the two techniques described above, it is desired to create interpolation frames with a higher precision in the former technique, and it is desired to improve the encoding efficiency in the latter technique.

An object of the present invention is to provide a decoding device, an encoding device, an interpolation frame creating system, an integrated circuit device, a decoding program and an encoding program for creating interpolation frames with a high precision while improving encoding efficiency.

BRIEF SUMMARY OF THE INVENTION

The decoding device according to a first aspect of the invention comprises decoding means, motion vector detection means, and interpolation frame creation means. The decoding means decodes an encoded image signal which is obtained by encoding image frames which form an image signal, and additional information for creating an interpolation frame which interpolates the image frames based on a first motion vector which is a motion vector between the image frames. The motion vector detection means detects a second motion vector which is a motion vector between the image frames which are decoded. The interpolation frame creation means creates an interpolation frame based on the second motion vector, the image frames which are decoded, and the additional information which is decoded.

The decoding means decodes the image frames and the additional information from the encoded image signal. The additional information is information for creating the interpolation frame which interpolates the image frames, and information for creating the interpolation frame based on the first motion vector detected for the image frames before being encoded. The motion vector detection means detects a second motion vector between the image frames after decoding using, for example, block matching. The interpolation frame creation means regards the second motion vector as the first motion vector, and creates the interpolation frame based on the second motion vector, the image frames and the additional information.

The first motion vector is not limited to motion vectors between the image frames located ahead of and behind the interpolation frame in terms of time, which are detected unidirectionally and bidirectionally. The first motion vector may also be motion vectors among a plurality of the image frames located ahead of or behind the interpolation frame in terms of time, which are detected unidirectionally and bidirectionally (this is also true of the following portion of this section). The frame may be a frame in a progressive scan image, or may be a frame or field in an interlace scan image (this is also true of the following portion of this section). The image frame may be intra-coded or inter-coded when it is being encoded (this is also true of the following portion of this section).

In the decoding device according to the present invention, only the additional information is the information required especially for creating the interpolation frame. The interpolation frame can be created at a high precision with the encoding efficiency being improved even when the motion vectors of the interpolation frame or the like is not included in the encoded image signal.

The decoding device according to a second aspect of the invention, is based on the first aspect of the invention, wherein the additional information includes at least one of: an interpolation method for the interpolation frame with respect to the image frames; residual information of the interpolation frame and an image frame corresponding to the interpolation frame; a vector difference between a motion vector of the interpolation frame which is detected with respect to the image frames and a motion vector of the interpolation frame which is derived based on the first motion vector with respect to the image frames; and a motion detection method which is used for detecting the first motion vector.

The interpolation method is, for example, information on a direction of the motion vector used for creating the interpolation frame, the image frames used for creating the interpolation frame, the interpolation position with respect to the image frames, and the like (this is also true of the following portion of this section). The residual information is, for example, a difference between a pixel value of the interpolation frame and the pixel value of the image frame used for creating the interpolation frame (this is also true of the following portion of this section). The vector difference is information for deriving the motion vectors of the interpolation frame based on the first motion vector, and for example, a difference between the motion vector of the interpolation frame detected by motion detection and the motion vector of the interpolation frame obtained by dividing the first motion vector internally or externally (this is also true of the following portion of this section). The motion detection method is information on algorithm for motion detection, a search range, a sub-pel precision, evaluation functions and the like (this is also true of the following portion of this section). The information on algorithm for motion detection is information specifying the search methods called full search, decimation search, OAT search, N-step search, hierarchical search, and the like. The information on the search range is information on an area in which block matching is performed. The information on the sub-pel precision is information on a precision with which block matching is performed. The information on evaluation functions is information specifying evaluation functions in block matching, such as sum of absolute difference (SAD), and sum of square difference (SSD), and the like.

The decoding device according to the present invention can achieve one of the following effects. When the interpolation method, the vector difference or the motion detection method is included in the additional information, the motion vectors of the interpolation frame can be created more precisely. Further, the interpolation frame can be created more precisely. When the residual information is included in the additional information, the pixel values of the interpolation frame can be created more precisely.

The decoding device according to a third aspect of the invention, is based on the second aspect of the invention, wherein the additional information further includes profile information for specifying a combination of information included in the additional information.

The profile information is the information on whether the information such as the interpolation method, residual information, the vector difference, the motion detection method, or the like is included in the additional information. The combination of the information included in the additional information can be specified by the number allocated to the respective combinations of the information, or the like.

In the decoding device according to the present invention, it is ensured that the combination of the information included in the additional information can be obtained. Thus, the interpolation frame can be created more precisely.

The decoding device according to a fourth aspect of the invention, is based on the second or third aspects of the invention, wherein: the motion detection method is included as code information for specifying a combination of parameters of motion detection; and the motion vector detection means detects the second motion vector based on the parameters of the motion detection specified by the code information.

The parameters of the motion detection are contents of information on algorithms on motion detection, search range, sub-pel precision, evaluation functions and the like. The code information specifies the combination of the parameters of the motion detection by, for example, the number allocated to the combinations of the parameters of the motion detection.

The motion vector detection means specifies the motion detection method by the obtained code information and detects the second motion vector by the specified motion detection method.

In the decoding device according to the present invention, the motion detection method is encoded collectively as the code information. Thus, the interpolation frame can be created at a high precision with the encoding efficiency being further improved.

The decoding device according to a fifth aspect of the invention, is based on any of the second to fourth aspects of the invention, wherein, when the motion detection method included in the additional information cannot be performed, the motion vector detection means detects the second motion vector using a predetermined motion detection method determined in accordance with the motion detection method included in the additional information.

When the motion detection method included in the additional information specifies an algorithm on motion detection which cannot be performed by the motion vector detection means, the motion vector detection means performs motion detection using another algorithm determined in accordance with the specified algorithm.

In the decoding device according to the present invention, even when the motion detection method used for detecting the first motion vector cannot be performed, another motion detection method can be used to detect the second motion vector. By using the motion detection method having properties which is as close as possible to the motion detection method used for detecting the first motion vector, a motion vector close to the first motion vector can be detected.

The decoding device according to a sixth aspect of the invention, is based on any of the second to fifth aspects of the invention, wherein the additional information is information produced for every interpolation frame.

In the decoding device according to the present invention, the additional information is created for every interpolation frame. Thus, the interpolation frame can be created at a higher precision.

The decoding device according to a seventh aspect of the invention, is based on any of the second to fifth aspects of the invention, wherein the motion detection method in the additional information is information produced for every stream of the encoded image signal.

In the decoding device according to the present invention, the motion detection method is produced for every stream. Thus, the encoding efficiency can be further improved.

The decoding device according to an eighth aspect of the invention, is based on any of the first to seventh aspects of the invention, wherein, when the additional information is not included in the encoded image signal, the interpolation frame creation means creates the interpolation frame based on the image frames which are decoded.

When the encoded image signal obtained by encoding the image signal by only intra-coding and inter-coding is obtained, in the interpolation frame creation means, the interpolation frame is created using the decoded image frame. The interpolation frame is created with a method of detecting a motion vector between the image frames and obtaining the motion vector of the interpolation frame to create the interpolation frame, a method of using the motion vector of inter-coded image frames and obtaining the motion vector of the interpolation frame to create the interpolation frame, or the like.

In the decoding device according to the present invention, the interpolation frame can be created even when the encoded image signal which does not include the additional information is obtained. This means that the compatibility with the conventional method is maintained.

The encoding device according to a ninth aspect of the invention comprises first motion vector detection means, additional information production means, and encoding means. The first motion vector detection means detects a first motion vector which is a motion vector between image frames forming an image signal. The additional information production means produces additional information for creating an interpolation frame which interpolates the image frames based on the first motion vector. The encoding means encodes the image frames and the additional information.

The first motion vector detection means detects the first motion vector between the image frames by, for example, block matching. The additional information production means produces additional information for creating the interpolation frame based on the first motion vector. The encoding means encodes the image frames and the additional information. The encoding of the image frames is performed by intra-coding or inter-coding.

In the encoding device according to the present invention, only the additional information is the information especially encoded for creating the interpolation frame. The encoding efficiency can be improved and the interpolation frame can be created at a high precision without encoding the motion vectors for the interpolation frame.

The encoding device according to a tenth aspect of the invention, is based on the ninth aspect of the invention, wherein the additional information includes at least one of: an interpolation method for the interpolation frame with respect to the image frames; residual information of the interpolation frame and an image frame corresponding to the interpolation frame; a vector difference between a motion vector of the interpolation frame which is detected with respect to the image frames and a motion vector of the interpolation frame which is derived based on the first motion vector with respect to the image frames; and a motion detection method which is used for detecting the first motion vector.

The encoding device according to the present invention can achieve one of the following effects. When the interpolation method, the vector difference or the motion detection method is included in the additional information, the motion vectors of the interpolation frame can be created more precisely. Further, the interpolation frame can be created more precisely. When the residual information is included in the additional information, the pixel values of the interpolation frame can be created more precisely.

The encoding device according to an eleventh aspect of the invention, is based on the tenth aspect of the invention, wherein the additional information further includes profile information for specifying a combination of information included in the additional information.

The profile information is the information on whether the information such as the interpolation method, residual information, the vector difference, the motion detection method, or the like is included in the additional information. The combination of the information included in the additional information can be specified by the number allocated to the respective combinations of the information, or the like.

In the encoding device according to the present invention, it is ensured that the combination of the information included in the additional information can be encoded. Thus, the interpolation frame can be created more precisely.

The encoding device according to a twelfth aspect of the invention, is based on the tenth or eleventh aspects of the invention, wherein the motion detection method is included as code information for specifying a combination of parameters of motion detection.

The parameters of the motion detection are contents of information on algorithms on motion detection, search range, sub-pel precision, evaluation functions and the like. The code information specifies the combination of the parameters of the motion detection by, for example, the number allocated to the combinations of the parameters of the motion detection.

In the encoding device according to the present invention, the motion detection method is encoded collectively as the code information. Thus, the interpolation frame can be created at a high precision with the encoding efficiency being further improved.

The encoding device according to a thirteenth aspect of the invention, is based on any of the tenth to twelfth aspects of the invention, wherein the additional information is information produced for every interpolation frame.

In the encoding device according to the present invention, the additional information is created for every interpolation frame. Thus, the interpolation frame can be created at a higher precision.

The encoding device according to a fourteenth aspect of the invention, is based on any of the tenth to twelfth aspects of the invention, wherein the motion detection method is included as header information of a stream of the image signal.

In the encoding device according to the present invention, the motion detection method is produced for every stream.

The encoding device according to a fifteenth aspect of the invention, is based on the eleventh aspect of the invention, wherein the profile information is included as header information of a stream of the image signal.

In an encoding device according to the present invention, the profile information is produced for every stream.

The encoding device according to a sixteenth aspect of the invention, is based on any of the ninth to fifteenth aspects of the invention, wherein, when a residual between an interpolation frame created based on the image frames and the image signal corresponding to the interpolation frame is small, the encoding means does not encode the additional information.

The encoding means does not encode additional information when the interpolation frame is created at a high precision based on the image frames. The interpolation frame is created with a method of detecting a motion vector between the image frames and obtaining the motion vector of the interpolation frame to create the interpolation frame, a method of using the motion vector of inter-coded image frames and obtaining the motion vector of the interpolation frame to create the interpolation frame, or the like.

In the encoding device according to the present invention, the encoding efficiency can be further improved, and the interpolation frame can be created at a high precision.

An interpolation frame creating system according to a seventeenth aspect of the invention is an interpolation frame creating system for creating an interpolation frame which interpolates image frames forming an image signal, and comprises first motion vector detection means, additional information production means, encoding means, decoding means, second motion vector detection means, and interpolation frame creation means. The first motion vector detection means detects a first motion vector which is a motion vector between the image frames. The additional information production means produces additional information for creating the interpolation frame based on the first motion vector. The encoding means encodes the image frames and the additional information. The decoding means decodes the image frames and the additional information which are encoded. The second motion vector detection means detects a second motion vector which is a motion vector between the image frames which are decoded. The interpolation frame creation means creates an interpolation frame based on the second motion vector, the image frames which are decoded, and the additional information which is decoded.

In the interpolation frame creating system according to the present invention, only the additional information is the information required especially for creating the interpolation frame. The interpolation frame can be created at a high precision with the encoding efficiency being improved even when the motion vectors of the interpolation frame or the like is not encoded.

An integrated circuit device according to a eighteenth aspect of the invention comprises a decoding section, a motion vector detection section, and an interpolation frame creation section. The decoding section decodes an encoded image signal which is obtained by encoding image frames which form an image signal, and additional information for creating an interpolation frame which interpolates the image frames based on a first motion vector which is a motion vector between the image frames. The motion vector detection section detects a second motion vector which is a motion vector between the image frames which are decoded. The interpolation frame creation section creates an interpolation frame based on the second motion vector, the image frames which are decoded, and the additional information which is decoded.

In the integrated circuit device according to the present invention, only the additional information is the information required especially for creating the interpolation frame. The interpolation frame can be created at a high precision with the encoding efficiency being improved even when the motion vectors of the interpolation frame or the like is not included in the encoded image signal.

An integrated circuit device according to a nineteenth aspect of the invention comprises a first motion vector detection section, an additional information producing section, and an encoding section. The first motion vector detection section detects a first motion vector which is a motion vector between image frames forming an image signal. The additional information producing section produces additional information for creating an interpolation frame which interpolates the image frames based on the first motion vector. The encoding section encodes the image frames and the additional information.

In the integrated circuit device according to the present invention, only the additional information is the information especially encoded for creating the interpolation frame. The encoding efficiency can be improved and the interpolation frame can be created at a high precision without encoding the motion vectors of the interpolation frame.

A decoding program according to a twentieth aspect of the invention is a decoding program for causing a computer to perform a decoding method which comprises a decoding step, a motion vector detection step, and an interpolation frame creation step. The decoding step is for decoding an encoded image signal which is obtained by encoding image frames which form an image signal, and additional information for creating an interpolation frame which interpolates the image frames based on a first motion vector which is a motion vector between the image frames. The motion vector detection step is for detecting a second motion vector which is a motion vector between the image frames which are decoded. The interpolation frame creation step is for creating an interpolation frame based on the second motion vector, the image frames which are decoded, and the additional information which is decoded.

In the decoding program according to the present invention, only the additional information is the information required especially for creating the interpolation frame. The interpolation frame can be created at a high precision with the encoding efficiency being improved even when the motion vectors of the interpolation frame or the like is not included in the encoded image signal.

The encoding program according to a twenty-first aspect of the invention is an encoding program for causing a computer to perform an encoding method which comprises a first motion vector detection step, an additional information production step, and an encoding step. The first motion vector detection step is for detecting a first motion vector which is a motion vector between image frames forming an image signal. The additional information production step is for producing additional information for creating an interpolation frame which interpolates the image frames based on the first motion vector. The encoding step is for encoding the image frames and the additional information.

In the encoding program according to the present invention, only the additional information is the information especially encoded for creating the interpolation frame. The encoding efficiency can be improved and the interpolation frame can be created at a high precision without encoding the motion vectors for the interpolation frame.

According to the present invention, there is provided a decoding device, an encoding device, an interpolation frame creating system, an integrated circuit device, a decoding program and an encoding program for creating interpolation frames at a high precision with an encoding efficiency being improved.

BRIEF DESCRIPTION OF THE DRAWINGS

FIG. 11 shows a table 115 for specifying a combination of the information included in the additional information d231.

DETAILED DESCRIPTION OF THE INVENTION

Embodiment 1

Structure of Interpolation Frame Creating System 10

With reference to FIGS. 1 through 12, an interpolation frame creating system, an encoding device, and a decoding device of Embodiment 1 of the present invention will be described.

Figure 1:
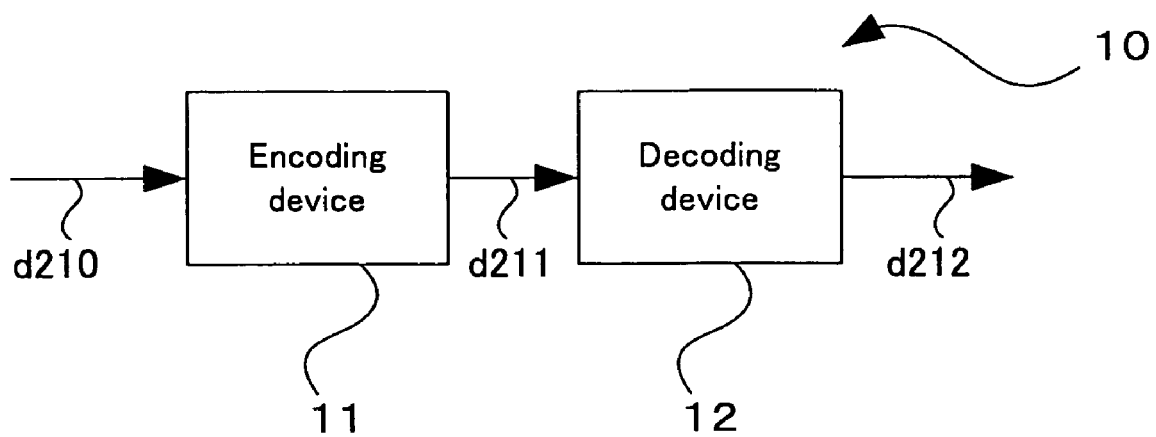
FIG. 1 is a block diagram showing an overview of an interpolation frame creating system 10.

FIG. 1 is a block diagram showing an overview of an interpolation frame creating system 10. The interpolation frame creating system 10 includes: an encoding device 11 which receives an image signal d210 as an input and outputs an encoded image signal d211 which has been encoded; and a decoding device 12 which receives the encoded image signal d211 as an input and outputs a decoded image signal d212 which has been decoded. The encoding device 11 is provided on a provider end which provides the image signal d210, and is connected to the decoding device 12 via a communication network such as the Internet and telephone lines, a broadcasting network such as ground-based broadcasting, cable television and satellite broadcasting, or the like. The decoding device 12 is provided on a receiver end which receives the encoded image signal d211. Generally, the decoding device 12 is provided in equipment treating images, such as, computers, cellular phones, PDAs, digital televisions, set-top-boxes for digital television, and car navigation systems.

The interpolation frame creating system 10 is a system intended for transmitting the image signal d210 at a bit rate as low as possible, i.e., with improved encoding efficiency, and transmitting the image signal d210 with picture quality as high as possible. More specifically, when the image signal d210 is intra-coded or inter-coded for each frame, motion vectors are not transmitted for some frames (for example, B frames). While the encoding efficiency is improved in this way, information which is necessary for decoding some frames (for example, B frames) is transmitted as additional information to improve the picture quality of the decoded image signal d212.

Hereinafter, with reference to FIGS. 2 through 8, the encoding device 11 and the decoding device 12 provided in the interpolation frame creating system 10 will be described in detail.

<Encoding Device 11>
(Structure of Encoding Device 11)

Figure 2:
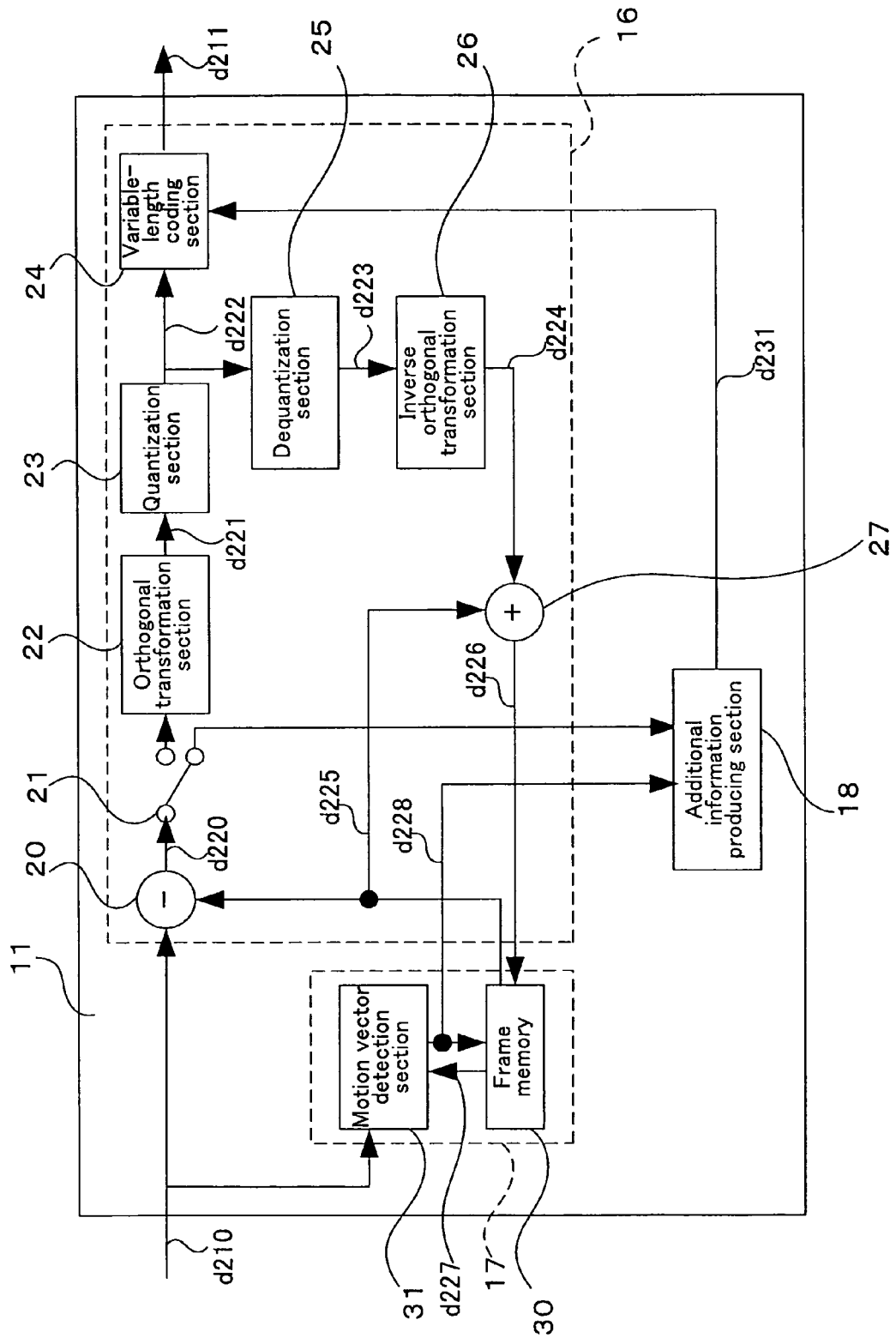
FIG. 2 is a block diagram showing a structure of an encoding device 11.

FIG. 2 is a block diagram illustrating a structure of the encoding device 11. The encoding device 11 is a device for encoding the image signal d210 by a method including orthogonal transformation and quantization, and outputting the encoded image signal d211. FIG. 2 illustrates the encoding device 11 when the image signal d210 is encoded by intra-coding or inter-coding used in MPEG and the like.

The encoding device 11 is a device for motion-compensation encoding the image signal d210 and outputting the encoded image signal d211. The encoding device 11 includes an encoding section 16, a motion compensation section 17, and an additional information producing section 18.

The encoding section 16 includes a subtraction section 20, a switch 21, an orthogonal transformation section 22, a quantization section 23, a variable length coding section 24, a dequantization section 25, an inverse orthogonal transformation section 26, and an addition section 27.

The subtraction section 20 receives the image signal d210 as a first input and a motion-compensated image signal d225 as a second input, and outputs a subtraction signal d220 which is a difference between the first input and the second input. The switch 21 is a switch for switching an output destination of the subtraction signal d220, and connected to the orthogonal transformation section 22 or the additional information producing section 18. The orthogonal transformation section 22 receives the subtraction signal d220 which is output from the switch 21 as an input, and outputs a DCT coefficient d221 obtained by orthogonally transforming the subtraction signal d220. The quantization section 23 receives the DCT coefficient d221 as an input, and outputs a quantized DCT coefficient d222 obtained by quantizing the DCT coefficient d221. The variable length coding section 24 receives the quantized DCT coefficient d222 as a first input and additional information d231 produced by the additional information producing section 18 as a second input, and outputs the encoded image signal d211 which is variable-length coded with motion vectors and an encoding mode obtained from the motion compensation section 17. The dequantization section 25 receives the quantized DCT coefficient d222 as an input, and outputs a dequantized DCT coefficient d223 obtained by dequantizing the quantized DCT coefficient d222. The inverse orthogonal transformation section 26 receives the dequantized DCT coefficient d223 as an input, and outputs an inverse orthogonal transformed signal d224 obtained by inversely orthogonal-transforming the dequantized DCT coefficient d223. The addition section 27 receives the inverse orthogonal transformed signal d224 as a first input and the motion-compensated image signal d225 as the second input, and outputs a local decoded signal d226 obtained by adding the first input and the second input.

The motion compensation section 17 includes a frame memory 30 and a motion vector detection section 31. The motion compensation section 17 receives the image signal d210 as a first input and the local decoded signal d226 as a second input, and outputs the motion-compensated image signal d225 as a first output and a detected motion vector d228 as a second output.

The frame memory 30 receives the local decoded signal d226 as a first input and the motion vector d228 detected by the motion vector detection section 31 as a second input, and outputs the motion-compensated image signal d225 which has been motion-compensated with the motion vector d228 as a first output and a local decoded signal d227 stored in the frame memory 30 as a second output. The motion vector detection section 31 receives the image signal d210 as a first input and the local decoded signal d227 stored in the frame memory 30 as a second input, and outputs the motion vector d228.

The additional information producing section 18 receives the subtraction signal d220 which is output from the switch 21 as a first input and the motion vector d228 as a second input, and outputs the additional information d231.

The variable length coding section 24 encodes the additional information d231 with the quantized DCT coefficient d222, the motion vector and/or the encoding mode obtained from the motion compensation section 17, and the like using variable-length coding. In the case where the additional information d231 is added, a series of codes encoded using variable-length coding may include marking information which indicates that the additional information d231 is added.

The sections described above are formed separately or integrally as integrated circuits such as LSIs. The frame memory 30 is a storage device such as DRAM, SRAM, and the like.

(Functions of Encoding Device 11)

Figure 3A:
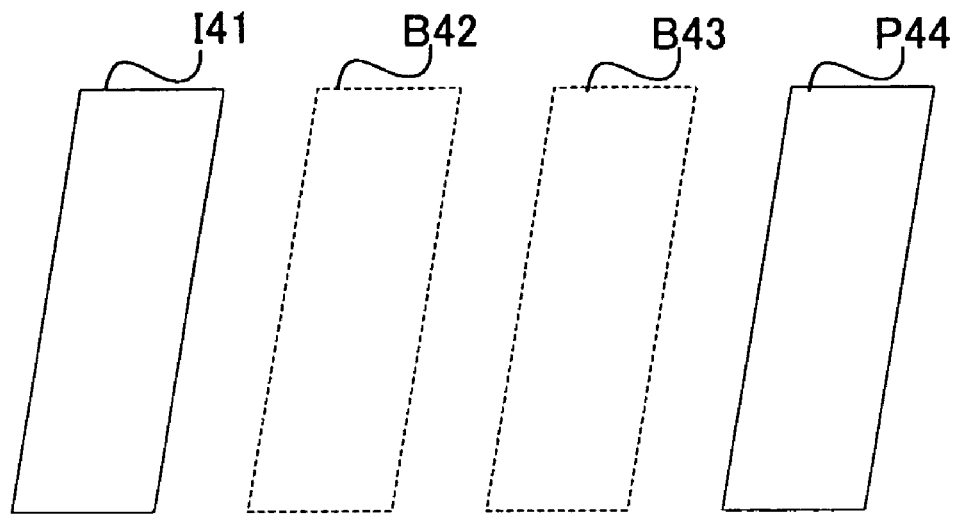
FIG. 3 is a diagram illustrating image frames which form an image signal d210.

With reference to FIGS. 3 and 4, an operation of the encoding device 11 for encoding image frames which form the image signal d210 (I frame I41, B frames B42 and B43, P frame P44 (see FIG. 3(a)) will be described. A feature of the present invention lies in encoding of the B frames B42 and B43.

<<Encoding of I Frame I41 and P Frame P44>>

For encoding the I frame I41, the subtraction section 20 does not perform a subtraction process. The switch 21 is turned to the orthogonal transformation section 22. Then, the I frame I41 which forms the image signal d210 is orthogonally transformed by the orthogonal transformation section 22, quantized by the quantization section 23, variable-length coded by the variable length coding section 24, and output as the encoded image signal d211. The quantized I frame I41 is also locally decoded and stored in the frame memory 30.

Figure 3B:
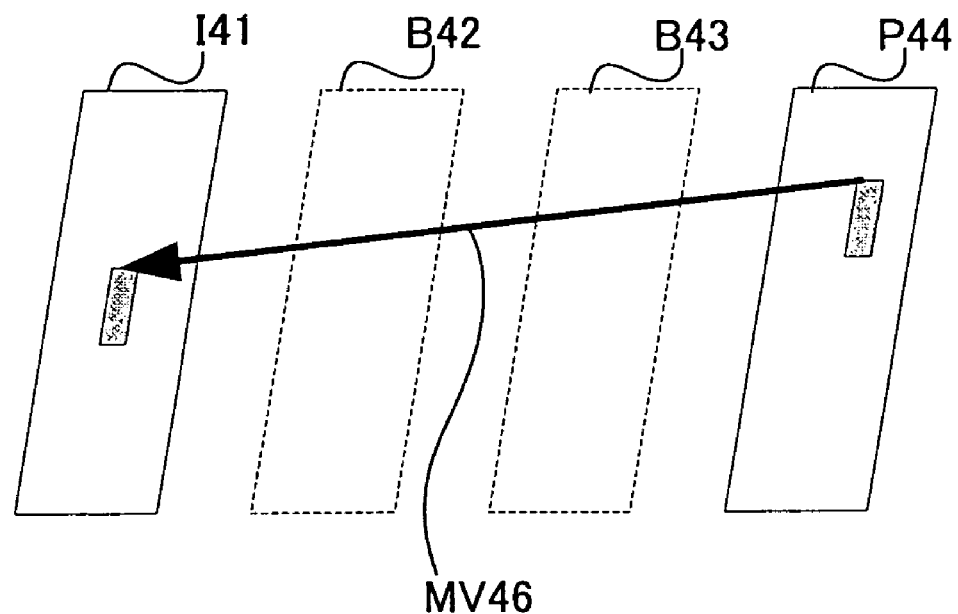

Encoding of the P frame P44 will be described with reference to FIG. 3(b). For encoding the P frame P44, the motion compensation section 17 detects a motion vector MV46 to the I frame I41 which has already been locally decoded and stored in the frame memory 30. Then, the motion compensation section 17 derives the image signal d225 which is motion-compensated with the detected motion vector MV46. The subtraction section 20 performs a subtraction process of the image signal d210 and the motion-compensated image signal d225, and outputs the subtraction signal d220. The switch 21 is turned to the orthogonal transformation section 22. Then, the subtraction signal d220 is orthogonally transformed by the orthogonal transformation section 22, quantized by the quantization section 23, variable-length coded by the variable length coding section 24, and output as the encoded image signal d211 with the detected motion vector MV46. The quantized P frame P44 is locally decoded and stored in the frame memory 30.

<<Encoding of B Frame B42>>

Encoding of the B frame B42 will be described with reference to FIG. 4. The B frame B43 is encoded similarly, and thus, the explanation is omitted.

(1)

Figure 4A:
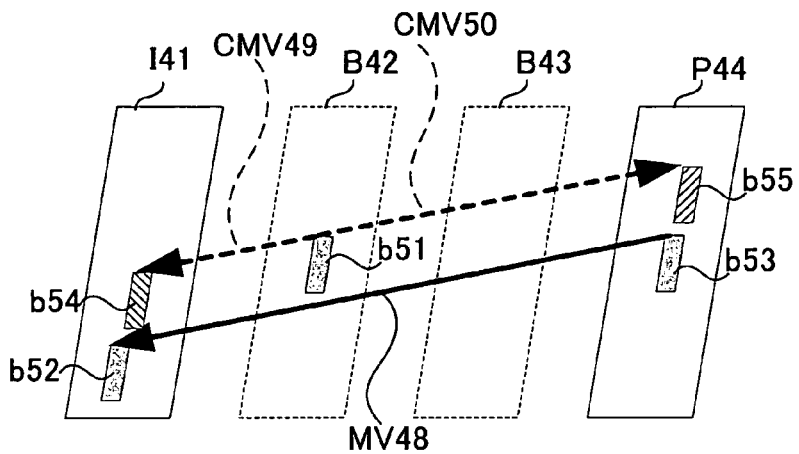
FIG. 4 is a diagram illustrating encoding of a B frame B42.

For encoding the B frame B42, the motion compensation section 17 detects motion vectors between the I frame I41 and the P frame P44 which have already been locally decoded and stored in the frame memory 30 (see FIG. 4(a)). More specifically, for encoding a block b51 of the B frame B42, block matching of a block b53 of the P frame P44 at the position corresponding to the block b51 is performed with respect to the I frame I41. Thus, a motion vector MV48 to a block b52 of the I frame I41 is detected. The detected motion vector MV48 is output from the motion vector detection section 31 to the additional information producing section 18 as the motion vector d228. With similar processes, motion vectors are output for all of the blocks of the B frame B42.

The frame memory 30 creates motion-compensated B frame B42 using the detected motion vector MV48. More specifically, the motion vector MV48 is divided internally in the ratio of a distance in terms of time between the I frame I41 and the B frame B42 in the image signal d210 to a distance in terms of time between the I frame I41 and the P frame P44 in the image signal d210 to derive an interpolation motion vector CMV49 from the block b51 to a block b54 of the I frame I41. The motion vector MV48 is also divided internally in the ratio of a distance in terms of time between the P frame P44 and the B frame B42 in the image signal d210 to a distance in terms of time between the I frame I41 and the P frame P44 in the image signal d210 to derive an interpolation motion vector CMV50 from the block b51 to a block b55 of the P frame P44. Then, a value obtained by averaging pixel values of the block b54 and the block b55 is output as the pixel value corresponding to the block b51 in the motion-compensated B frame B42. The value obtained by averaging pixel values of the block b54 and the block b55 is output from the frame memory 30 as the motion-compensated image signal d225. With similar processes, motion-compensated pixel values are output for all of the blocks of the B frame B42.

The subtraction section 20 performs a subtraction process of the image signal d210 and the motion-compensated image signal d225, and outputs the subtraction signal d220. The switch 21 is turned to the additional information producing section 18. The subtraction signal d220 is input to the additional information producing section 18.

The additional information producing section 18 produces the additional information d231 in accordance with the size of the input subtraction signal d220. More specifically, when the size of the subtraction signal d220 is zero or smaller than a predetermined threshold value, the additional information producing section 18 produces information representing an interpolation method for the B frame B42 and a motion detection method for the motion vector MV48 as the additional information d231. The produced additional information d231 is encoded at the variable length coding section 24 after quantized DCT coefficient d222 for the P frame P44.

Herein, the information representing the interpolation method is information specifying a direction of the motion vector MV48 used for creating the B frame B42, and the I frame I41 and the P frame P44 used for creating the B frame B42, information on the interpolation position of the B frame B42, and the like.

The information representing the motion detection method is information on algorithm for motion detection, a search range, a sub-pel precision, evaluation functions and the like. The information on algorithm for motion detection is information specifying search methods called full search, decimation search, OAT search, N-step search, hierarchical search, and the like. The information on the search range is information on a size of a pixel area by which block matching is performed (for example, ±8 pixels, ±16 pixels, ±32 pixels, ±64 pixels and the like). The information on the sub-pel precision is information on a pixel precision with which block matching is performed (for example, unit of an integer number of pixels, ½ pixel unit, ¼ pixel unit, ⅛ pixel unit, and the like). The information on the evaluation functions is information specifying evaluation functions in block matching, such as sum of absolute difference (SAD), and sum of square difference (SSD), and the like.

(2)

Figure 4B:
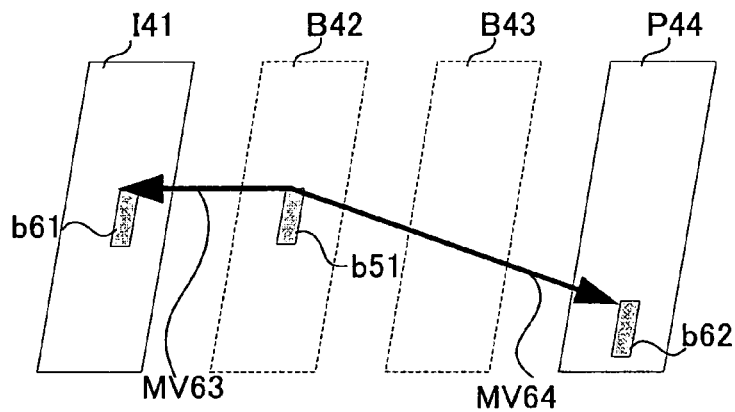
Figure 4C:
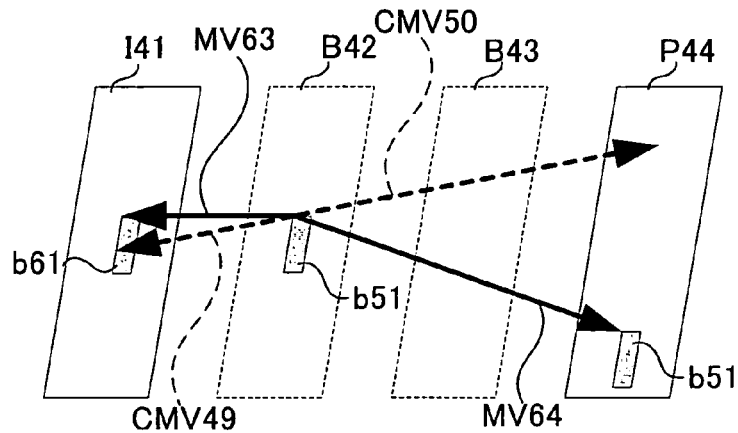

When the size of the subtraction signal d220 is larger than the predetermined threshold value, the motion compensation section 17 detects motion vectors of the B frame B42 in the image signal d210 to the I frame I41 and the P frame P44 which have already been locally decoded and stored in the frame memory 30 (see FIG. 4(b)). More specifically, for encoding the block b51 of the B frame B42 in the image signal d210, bidirectional block matching of the block b51 is performed, and a motion vector MV63 to a block b61 of the I frame I41 and a motion vector MV64 to a block b62 of the P frame P44 are detected. The detected motion vectors MV63 and MV64 are output to the additional information producing section 18 from the motion vector detection section 31 as the motion vector d228. With similar processes, motion vectors are output for all the blocks of the B frame B42.

Then, the frame memory 30 creates motion-compensated B frame B42 using the detected motion vectors MV63 and MV64. More specifically, a value obtained by averaging pixel values of the block b61 and the block b62 is output as the pixel value corresponding to the block b51 in the motion-compensated B frame B42. The value obtained by averaging pixel values of the block b61 and the block b62 is output from the frame memory 30 as the motion-compensated image signal d225. With similar processes, motion-compensated pixel values are output for all blocks of the B frame B42.

The subtraction section 20 performs a subtraction process of the B frame B42 which forms the image signal d210 and the motion-compensated image signal d225 (the B frame B42 which is motion compensated with the motion vectors MV63 and MV64), and outputs the subtraction signal d220. The switch 21 is turned to the additional information producing section 18. The subtraction signal d220 is input to the additional information producing section 18.

The additional information producing section 18 produces residual information and information representing vector differences as the additional information d231 in addition to the above-described interpolation method and the motion detection method. The produced additional information d231 is encoded at the variable length coding section 24 after the quantized DCT coefficient d222 for the P frame P44.

Herein, the residual information represents a value of the subtraction signal d220. The information representing vector differences is information for deriving the motion vectors MV63 and MV64 of the B frame B42 based on the motion vector MV48. Specifically, it represents a vector difference between the motion vectors MV63 and the interpolation motion vector CMV49 and a vector difference between the motion vector MV64 and the interpolation motion vector CMV50 (see FIG. 4(*c*)).

(Method and Program)

Figure 5:
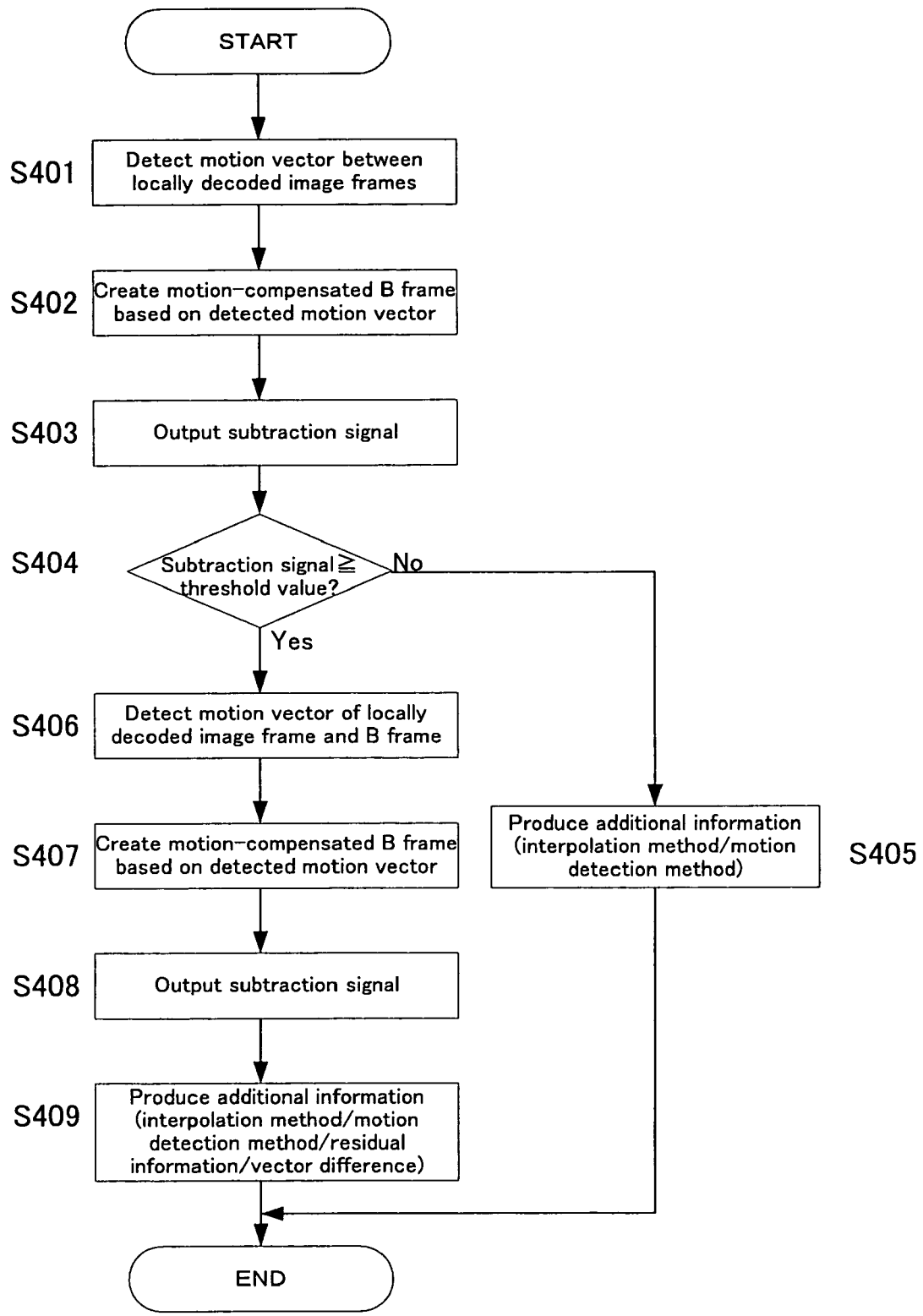
FIG. 5 is a flow diagram illustrating an additional information producing method.

FIG. 5 shows a flow diagram illustrating an additional information producing method in the encoding device 11. The details are as described above, and thus, detailed description is omitted. A part or all of the additional information producing method can be implemented as a program.

For encoding the B frame B42 in the image signal d210, the motion compensation section 17 detects motion vectors between the I frame I41 and the P frame P44 which have already been locally decoded and stored in the frame memory 30 (step S401). Then, the frame memory 30 creates the motion-compensated B frame B42 using the detected motion vectors (step S402). The subtraction section 20 performs a subtraction process of the B frame B42 included the image signal d210 and the motion-compensated B frame B42, and outputs the subtraction signal d220 (step S403).

The additional information producing section 18 produces the additional information d231 in accordance with the size of the input subtraction signal d220.

When the size of the subtraction signal d220 is zero or smaller than the predetermined threshold value, the additional information producing section 18 produces information representing an interpolation method for the B frame B42 and a motion detection method for the motion vector MV48 as the additional information d231 (steps S404 and S405).

When the size of the subtraction signal d220 is larger than the predetermined threshold value, the motion compensation section 17 detects motion vectors of the B frame B42 in the image signal d210 to the I frame I41 and the P frame P44 which have already been locally decoded and stored in the frame memory 30 (step S406). The frame memory 30 creates motion-compensated B frame B42 using the detected motion vectors (step S407). The subtraction section 20 performs a subtraction process of the B frame B42 included in the image signal d210 and the motion-compensated B frame B42, and outputs the subtraction signal d220 (step S408).

The additional information producing section 18 produces residual information and information representing vector differences as the additional information d231 in addition to the interpolation method and the motion detection method (step S409). Herein, the residual information represents a value of the subtraction signal d220 which is output at step S408. The information representing the vector differences represents differences between the motion vectors detected at step S406 and the interpolation motion vectors created from the motion vectors detected at step S401.

<Decoding Device 12>

(Structure of Decoding Device 12)

Figure 6:
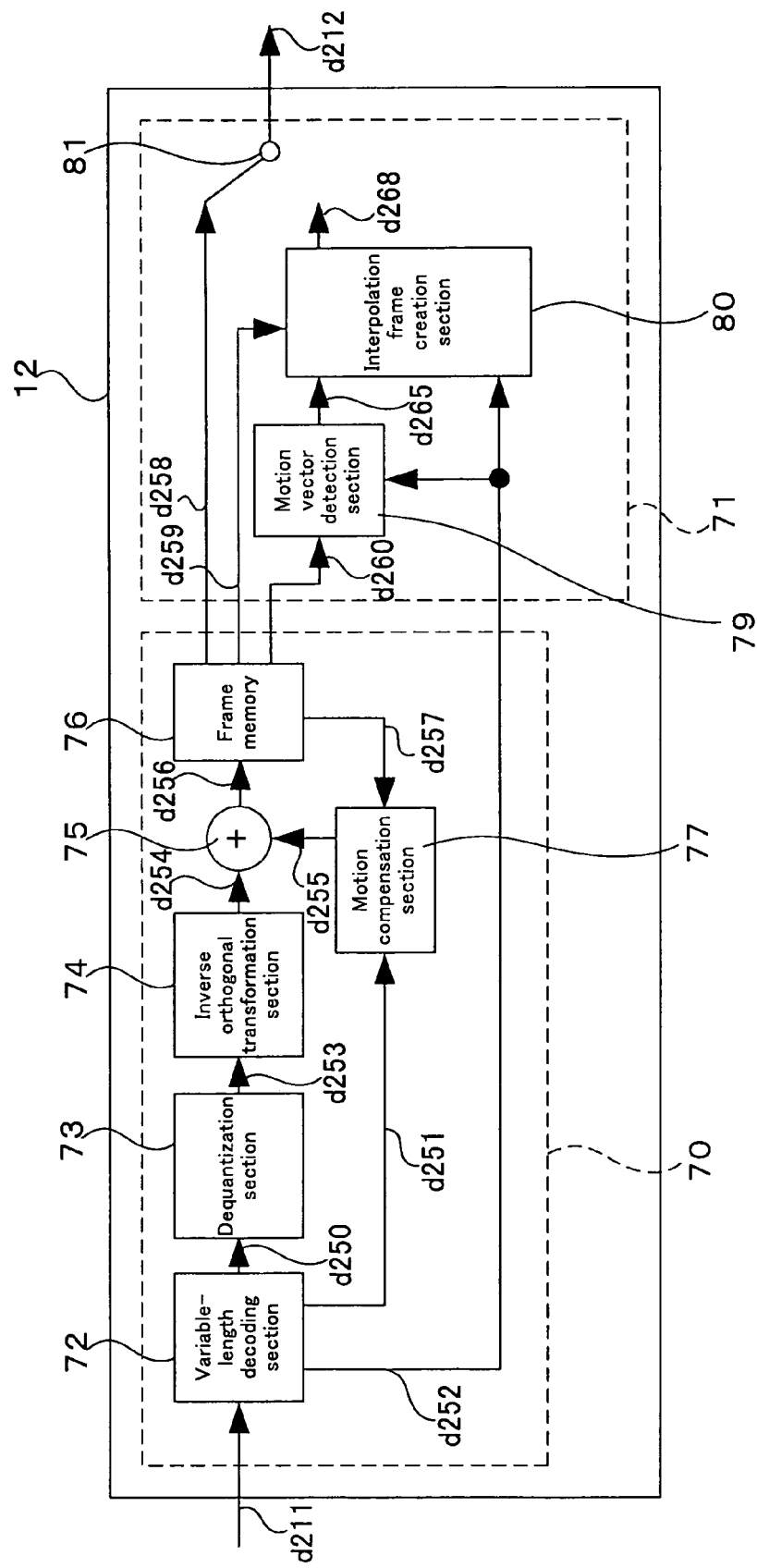
FIG. 6 is a block diagram illustrating a structure of a decoding device 12.

FIG. 6 is a block diagram illustrating a structure of the encoding device 12. The encoding device 12 is a device for decoding the encoded image signal d211 obtained by encoding the image signal d210 with a method including orthogonal transformation and quantization, and outputting the decoded image signal d212. The decoding device 12 includes a decoding section 70 and a frame outputting section 71.

The decoding section 70 receives the encoded image signal d211 which is motion-compensation coded as an input and outputs image frames d258 through d260 as first through third outputs and additional information d252 as fourth output. The decoding section 70 includes a variable length decoding section 72, a dequantization section 73, an inverse orthogonal transformation section 74, an addition section 75, a frame memory 76, and a motion compensation section 77.

The variable length decoding section 72 receives the encoded image signal d211 as a first input, decodes the encoded image signal d211, and outputs a quantized DCT coefficient d250 as a first output, a decoded motion vector d251 as a second output, and the additional information d252 as a third output. The dequantization section 73 receives the quantized DCT coefficient d250 as an input, and outputs a dequantized DCT coefficient d253 obtained by dequantizing the quantized DCT coefficient d250. The inverse orthogonal transformation section 74 receives the dequantized DCT coefficient d253 as an input, and outputs an inverse orthogonal transformed signal d254 which is obtained by inversely orthogonal-transforming the dequantized DCT coefficient d253. The addition section 75 receives the inverse orthogonal transformed signal d254 as a first input and a motion-compensated image frame d255 as a second input, and outputs an addition signal d256 obtained by adding the first input and the second input. The frame memory 76 receives the addition signal d256 as an input, and outputs image frames d257 through d260 as first through fourth outputs. The motion compensation section 77 receives the decoded motion vector d251 as a first input and the image frame d257 as a second input, and outputs the motion-compensated image frame d255.

The frame outputting section 71 receives the image frames d258 through d260 as first through third inputs and the additional information as a fourth input, and outputs the decoded image signal d212. The frame outputting section 71 includes a motion vector detection section 79, an interpolation frame creation section 80, and a switch 81.

The motion vector detection section 79 receives the image frame d260 as a first input and the additional information d252 as a second input, and outputs a motion vector d265 detected between the image frame d260. The interpolation frame creation section 80 receives the image frame d259 as a first input, the motion vector d265 as a second input and the additional information d252 as a third input, and outputs an interpolation frame d268. The switch 81 receives the image frame d258 as a first input and the interpolation frame d268 as a second input, and is switched between the two inputs to output the decoded image signal d212.

The sections described above are formed separately or integrally as integrated circuits such as LSIs. The frame memory 76 is a storage device such as DRAM, SRAM, and the like.

(Functions of Decoding Device 12)

An operation of the decoding device 12 for decoding the encoded image signal d211 obtained by encoding image frames which form the image signal d210 (I frame I41, B frames B42 and B43, P frame P44 (see FIG. 3(*a*)) will be described. A feature of the present invention lies in decoding of the B frames B42 and B43.

<<Decoding of I frame I41 and P frame P44>>

For decoding the I frame I41, the encoded image signal d211 is variable-length decoded by the variable length decoding section 72, dequantized by the dequantization section 73, and inversely orthogonal-transformed by the inverse orthogonal transformation section 74 to output the inverse orthogonal transformed signal d254. The addition section 75 does not perform an addition process. The frame memory 76 stores the decoded I frame I41. The switch 81 is turned to the frame memory 76 at the time in which the I frame I41 is output. Thus, the I frame I41 is output as the decoded image signal d212.

For decoding the P frame P44, the encoded image signal d211 is variable-length decoded by the variable length decoding section 72, dequantized by the dequantization section 73, and inversely orthogonal-transformed by the inverse orthogonal transformation section 74 to output the inverse orthogonal transformed signal d254. The motion compensation section 77 outputs the motion-compensated image frame d255 (motion-compensated P frame P44) using the decoded motion vector d251 obtained from the variable length decoding section 72 and the I frame I41 stored in the frame memory 76. The addition section 75 adds the inverse orthogonal transformed signal d254 and the motion-compensated image frame d255. The frame memory 76 stores the decoded P frame P44. The switch 81 is turned to the frame memory 76 at the time in which the P frame P44 is output. Thus, the P frame P44 is output as the decoded image signal d212.

<<Decoding of B frame B42>>

Decoding of the B frame B42 will be described with reference to FIG. 7. The B frame B43 is decoded similarly, and thus, the explanation is omitted.

(1)

When the encoded image signal d211 does not include the additional information d252, the decoding section 70 determines that encoding similar to that for a conventional B frame is performed. Specifically, the encoded image signal d211 is variable-length decoded by the variable length decoding section 72, dequantized by the dequantization section 73, and inversely orthogonal-transformed by the inverse orthogonal transformation section 74 to output the inverse orthogonal transformed signal d254. The motion compensation section 77 outputs the motion-compensated image frame d255 (motion-compensated B frame B42) using the decoded motion vector d251 obtained from the variable length decoding section 72 and the I frame I41 or the P frame P44 stored in the frame memory 76. The addition section 75 adds the inverse orthogonal transformed signal d254 and motion-compensated image frame d255. The frame memory 76 stores the decoded B frame B42. The switch 81 is turned to the frame memory 76 at the time in which the B frame B42 is output. Thus, the B frame B42 is output as the decoded image signal d212.

(2)

When the encoded image signal d211 includes the additional information d252, the B frame B42 is created at the frame outputting section 71. The details will be described below.

Whether the encoded image signal d211 includes the additional information d252 or not may be determined based on presence or absence of the additional information d252. However, it may be determined based on whether the encoded image signal d211 to be variable-length decoded includes marking information or not. The marking information indicates whether the additional information d231 is added to the encoded image signal d211 or not, and may be a flag or the like, for example.

(2-1)

The motion vector detection section 79 obtains the information representing the interpolation method and the motion detection method included in the additional information d252, and detects motion vectors.

Herein, the information representing the interpolation method is information specifying a direction of the motion vector used for creating the B frame B42, and the I frame I41 and the P frame P44 used for creating the B frame B42, information on the interpolation position of the B frame B42, and the like.

The information representing motion detection method is information on algorithm for motion detection, a search range, a sub-pel precision, evaluation functions and the like. The information on algorithm for motion detection is information specifying the search methods called full search, decimation search, OAT search, N-step search, hierarchical search, and the like. The information on the search range is information on an area by which block matching is performed. The information on the sub-pel precision is information on a precision with which block matching is performed. The information on evaluation functions is information specifying evaluation functions in block matching, such as sum of absolute difference (SAD), and sum of square difference (SSD), and the like.

With reference to FIG. 7(*a*), the details of the operation of the motion vector detection section 79 will be further described. For decoding the block b51 of the B frame B42, the motion vector detection section 79 detects a motion vector between the image frames specified by the interpolation method, which is a motion vector of a block at the position corresponding to the block b51. FIG. 7(*a*) shows a motion vector MV90 which is detected when information that the motion vector used for producing the B frame B42 is the motion vector from the P frame P44 to the I frame I41 is included as the information representing the interpolation method. In such a case, the motion vector detection section 79 detects the motion vector MV90 from the block b53 of the P frame P44 to a block b91 of the I frame I41, which are stored in the frame memory 76. At this time, the motion vector detection section 79 detects the motion vector MV90 with the motion detection method included in the additional information d252.

(2-2)

The interpolation frame creation section 80 obtains the interpolation method, the residual information, and vector differences included in the additional information d252, and creates the B frame B42.

Herein, the residual information represents a value of the subtraction signal d220 which is obtained by a subtraction process of the B frame B42 included in the image signal d210 and the motion-compensated B frame B42. The vector differences are the vector difference between the motion vector MV63 and the interpolation motion vector CMV49 and the vector difference between the motion vector MV64 and the interpolation motion vector CMV50 (see FIG. 4(c)).

Figure 7A:
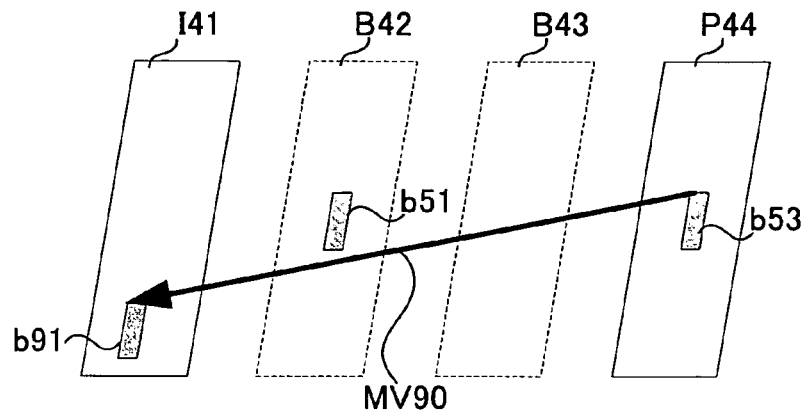
FIG. 7 is a diagram illustrating decoding of the B frame B42.
Figure 7B:
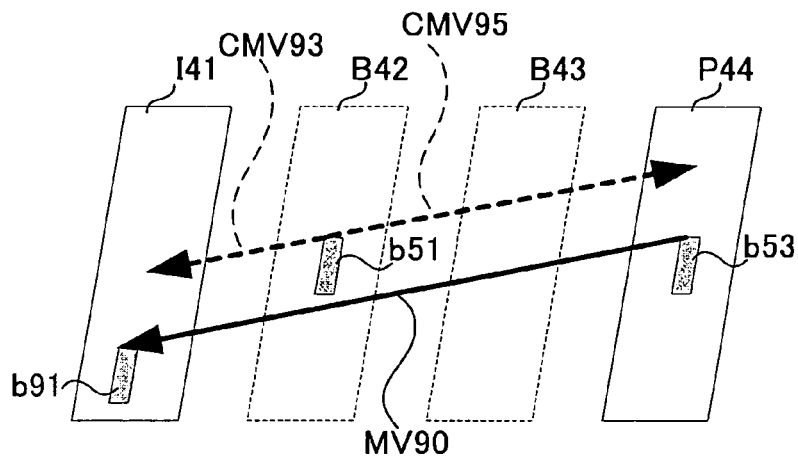
Figure 7C:
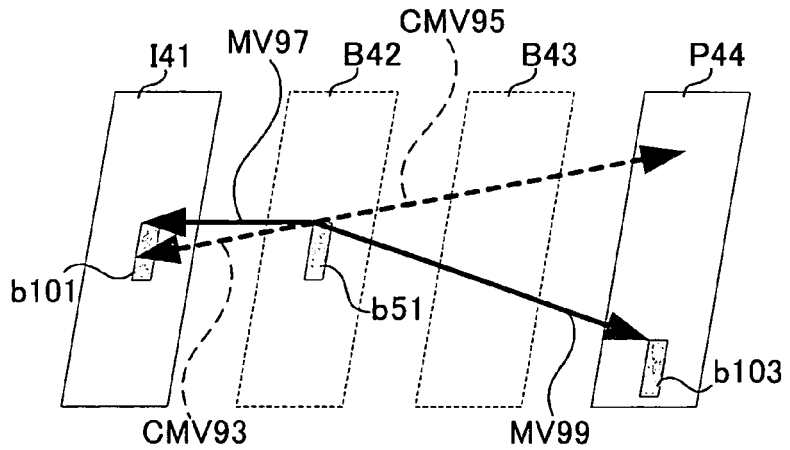

With reference to FIGS. 7(b) and 7(c), the operation of the interpolation frame creation section 80 will be further described in detail. The interpolation frame creation section 80 divides the motion vector MV90 detected by the motion vector detection section 79 internally at the interpolation position of the B frame B42 included in the interpolation method to derive an interpolation motion vector CMV93 from the B frame B42 to the I frame I41, and an interpolation motion vector CMV95 from the B frame B42 to the P frame P44 (see FIG. 7(b)).

To the derived interpolation motion vector CMV93, the vector difference between the motion vector MV63 and the interpolation motion vector CMV49 is added to create a motion vector MV97 from the B frame B42 to the I frame I41 (see FIG. 7(c)). Similarly, to the derived interpolation motion vector CMV95, the vector difference between the motion vector MV64 and the interpolation motion vector CMV50 is added to create a motion vector MV99 from the B frame B42 to the P frame P44 (see FIG. 7(c)).

Then, the created motion vectors MV97 and MV99 are used to create the motion-compensated B frame B42. More specifically, as pixel values corresponding to the block b51 of the motion-compensated B frame B42, the average of the pixel values of a block b101 located where the block b51 is moved by the motion vector MV97 and a block b103 located where the block b51 is moved by the motion vector MV99 is calculated. The interpolation frame creation section 80 obtains the pixel values of the block b101 and the block b103 from the image frame d259 which is output from the frame memory 76.

When the additional information d252 includes the residual information, the interpolation frame creation section 80 further adds the value of the residual information to the value of the motion-compensated B frame B42, and outputs the decoded B frame B42. The decoded B frame B42 is output from the interpolation frame creation section 80 as the interpolation frame d268.

The switch 81 is turned to the interpolation frame creation section 80 at the time in which the B frame B42 is output. Thus, the B frame B42 is output as the decoded image signal d212.

(Method and Program)

Figure 8:
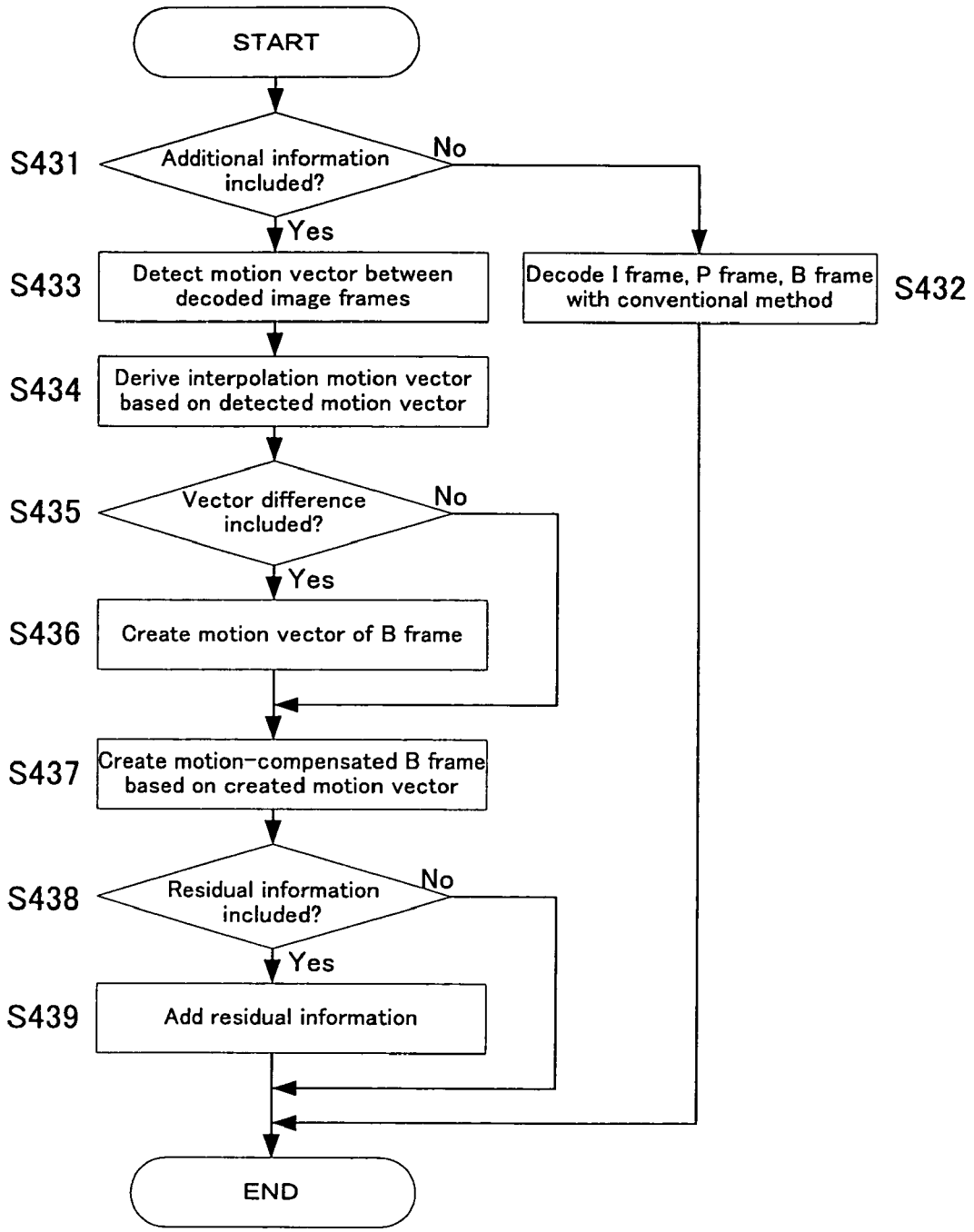
FIG. 8 is a flow diagram illustrating an interpolation frame creating method.

FIG. 8 shows a flow diagram illustrating a method for creating an interpolation frame in the decoding device 12. The details are as described above, and thus, detailed description is omitted. A part or all of the interpolation frame creating method can be implemented as a program.

When the encoded image signal d211 does not include the additional information d252, the decoding section 70 decodes an I frame which has been intra-coded, or a P frame or B frame which have been inter-coded (steps S431 and S432).

When the encoded image signal d211 includes the additional information d252, the frame outputting section 71 decodes the B frame B42 (see FIG. 7(a)) (steps S433 through S439).

Based on the interpolation method and the motion detection method included in the additional information d252, the motion vectors for the image frames stored in the frame memory 76 are detected (step S433). Further, based on the interpolation method included in the additional information d252, the interpolation motion vector is derived from the motion vectors detected at step S433 (step S434). The interpolation frame creation section 80 determines whether the additional information d252 includes the vector difference or not (step S435), and, when the vector difference is included, the vector difference is added to the interpolation motion vector to create the motion vector from the B frame B42 to the I frame I41 or the P frame P44 (step S436). When the vector difference is not included, the derived interpolation motion vectors are regarded as the created motion vectors.

The interpolation frame creation section 80 creates the motion-compensated B frame B42 using the created motion vectors (step S437). The interpolation frame creation section 80 determines whether the additional information d252 includes the residual information or not (step S438). When the residual information is included, the interpolation frame creation section 80 applies the residual information to the motion-compensated B frame B42 (step S439) to create the decoded B frame B42. When the residual information is not included, the motion-compensated B frame B42 created at step S437 is regarded as the decoded B frame B42.

<Effects of Interpolation Frame Creating System 10>

(Effects of Encoding Device 11)

<<1>>

In the encoding device 11 according to the present invention, only the additional information d231 is encoded especially for creating the B frame B42. The encoding efficiency can be improved and the interpolation frames can be created at a high precision without encoding the motion vectors detected for the B frame B42 (motion vectors MV63 and MV64 (see FIG. 4(b)).

<<2>>

The encoding device 11 according to the present invention can achieve one of the following effects. When the interpolation method, the vector difference or the motion detection method is included in the additional information d231, the motion vectors MV63 and MV64 of the B frame B42 can be created more precisely. The B frame B42 can be created more precisely. When the residual information is included in the additional information d231, the pixel values of the B frame B42 can be created more precisely.

<<3>>

In the encoding device 11 according to the present invention, the information included in the additional information d231 can be modified as necessary (see FIG. 5, step S404). Thus, the encoding efficiency can be further improved.

<<4>>

In the encoding device 11 according to the present invention, the additional information d231 is produced for each of the B frames. Thus, the interpolation frames can be created at a higher precision.

(Effects of Decoding Device 12)

<<1>>

In the decoding device 12 according to the present invention, only the additional information d231 is encoded especially for creating the B frame B42. The encoding efficiency can be improved and the interpolation frames can be created at a high precision even when the motion vectors detected for the B frame B42 in the image signal d210 (motion vectors MV63 and MV64 (see FIG. 4(b)) are not encoded.

<<2>>

The decoding device 12 according to the present invention can achieve one of the following effects. When the interpolation method, the vector difference or the motion detection method is included in the additional information d231, the motion vectors MV63 and MV64 of the B frame B42 in the image signal d210 can be created more precisely. The B frame B42 can be created more precisely. When the residual information is included in the additional information d231, the pixel values of the B frame B42 can be created more precisely.

<<3>>

In the decoding device 12 according to the present invention, the B frame B42 can be created even when the encoded image signal d211 which does not include the additional information d231 is obtained (see FIG. 8, step S431). This means that compatibility with the conventional method is maintained.

<<4>>

In the decoding device 12 according to the present invention, the additional information d231 is produced for each of the B frames. Thus, the interpolation frames can be created with a higher precision.

(Effects of Interpolation Frame Creating System 10)

<<1>>

In interpolation frame creating system 10 according to the present invention, only the additional information d231 is encoded especially for creating the B frame B42. The encoding efficiency can be improved and the interpolation frames can be created at a high precision even when the motion vectors detected for the B frame B42 (motion vectors MV63 and MV64 (see FIG. 4(b)) are not encoded.

Such an effect will be described in more specifically. In the interpolation frame creating system 10, the motion vector detection section 31 of the encoding device 11 and the motion vector detection section 79 of the decoding device 12 can perform similar motion detection using the additional information d231. This allows the motion vector MV48 (see FIG. 4) and the motion vector MV90 (see FIG. 7) to be detected as vectors approximate each other. Further, information to become a basis for encoding and decoding (the motion vector MV48 and the motion vector MV90) itself is not transmitted, but a difference in the information to be the basis is transmitted. Thus, the encoding efficiency can be improved. Moreover, the interpolation frames can be created at a precision as high as that in the conventional method.

<Variants>

The present invention is not limited to the above embodiment. Rather, variations and modifications can be made without departing from the scope of the present invention. The method described in the above embodiment can be implemented as a program by computers or the like.

(Regarding Motion Vectors)

<<1>>

In the above embodiment, it is described that the motion vector MV48 between the I frame I41 which is located ahead of the B frame B42 in terms of time and the P frame P44 which is located behind the B frame B42 in terms of time (see FIG. 4) is detected. The motion vector to be detected for encoding the B frame B42 is not limited to this.

For example, a motion vector from the I frame I41 to the P frame P44 may be detected. Motion vectors among a plurality of image frames located ahead of or behind the B frame B42 in terms of time may also be detected. Motion vectors may be detected not only unidirectionally but also bidirectionally.

Further, detection precisions for the motion vectors in the plurality of detection methods described above may be compared to each other and the method with the highest precision may be employed.

The structure of the frames as shown in FIG. 4 is merely an example, and the effect of the present invention is not limited to such a structure of the frames.

For example, the I frame I41 may be replaced with a P frame, and the P frame P44 may be replaced with an I frame. Also, the number of the B frames is not limited to the number as shown in FIG. 4.

The effect of the present invention is not limited to the method for encoding the I frame I41 and the P frame P44 as described in the above embodiment. For example, the I frame I41 may be encoded by performing a subtraction process of the pixel values produced at the frame memory 30 in accordance with predetermined rules. More specifically, as performed in MPEG-4 or the like, intra-coding may be performed by producing a predictive pixel within the frame, subtracting its pixel value, and encoding its residual component. In short, according to the present invention, an encoded frame can be used instead of the I frame I41 or the P frame P44 irrespective of the encoding method.

Similarly, the effect of the present invention is not limited to the method for decoding the I frame I41 and the P frame P44 as described in the above embodiment. For example, the addition section 75 may decode the I frame I41 by performing an addition process of pixel values produced at the frame memory 76 in accordance with predetermined rules.

<<2>>

In the above embodiment, it is described that the motion vector MV48 for deriving the interpolation motion vectors CMV49 and CMV50 for the block b51 is the motion vector detected for the block b53 of the P frame P44 which is at the position corresponding to the block b51 (see FIG. 4). However, the method for detecting motion vectors is not limited to this.

For example, the motion vector for deriving the interpolation motion vectors for the block b51 may be a motion vector which traverses the block b51 among the motion vectors detected between the P frame P44 and the I frame I41.

In such a case, if there is more than one motion vectors which traverse the block b51, a pixel value corresponding to the block b51 of the motion compensated B frame B42 with the motion vectors may be a simple average or weighted average value of the pixel values of the blocks used for detecting the plurality of motion vectors.

If there is no vector which traverses the block b51 in this case, the pixel value may be an average value of the motion vectors of the blocks near the block b51, a value of linear interpolation, a value obtained by a smoothing filter, a value obtained by a weighted smoothing filter, or the like.

<<3>>

In the above embodiment, it is described that the interpolation motion vectors CMV49 and CMV50 for the B frame B42 in two directions are derived, motion vectors of MV63 and MV64 for the B frame B42 in two directions are detected, and vector differences are calculated respectively. However, the motion vectors obtained for the respective blocks of the B frame B42 may not be limited to bidirectional motion vectors.

For example, a motion vector in one direction may be detected, or more motion vectors may be detected.

<<4>>

In the above embodiment, it is described that the interpolation motion vectors CMV49 and CMV50 for the block b51 are values calculated using the motion vectors detected for the block b53 of the P frame P44 which is at the position corresponding to the block b51, or the motion vector which traverses the block b51 among the motion vectors detected between the P frame P44 and the I frame I41 (see FIG. 4). However, the method for deriving the interpolation motion vectors is not limited to this.

Figure 9A:
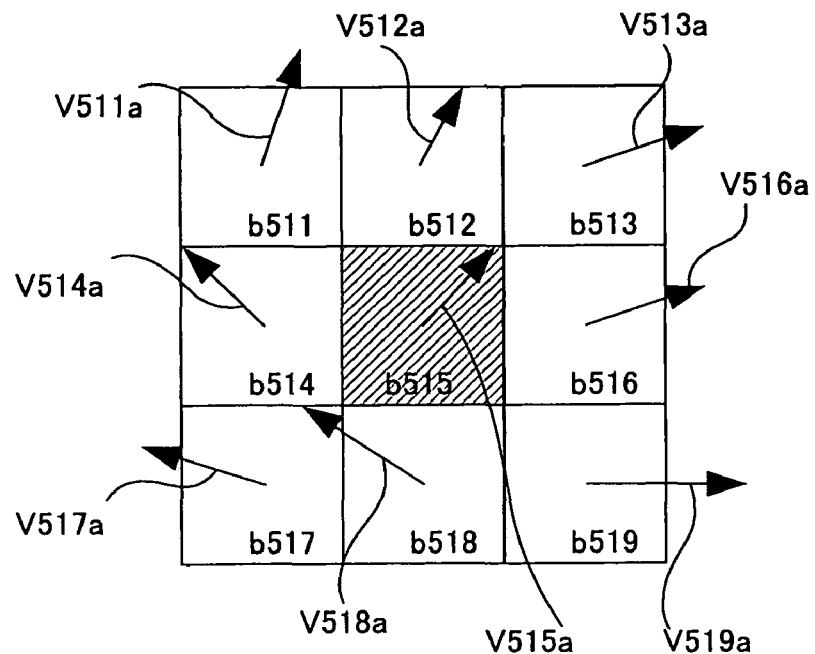
FIG. 9 is a diagram illustrating a variant of a method for deriving interpolation motion vectors.
Figure 9B:
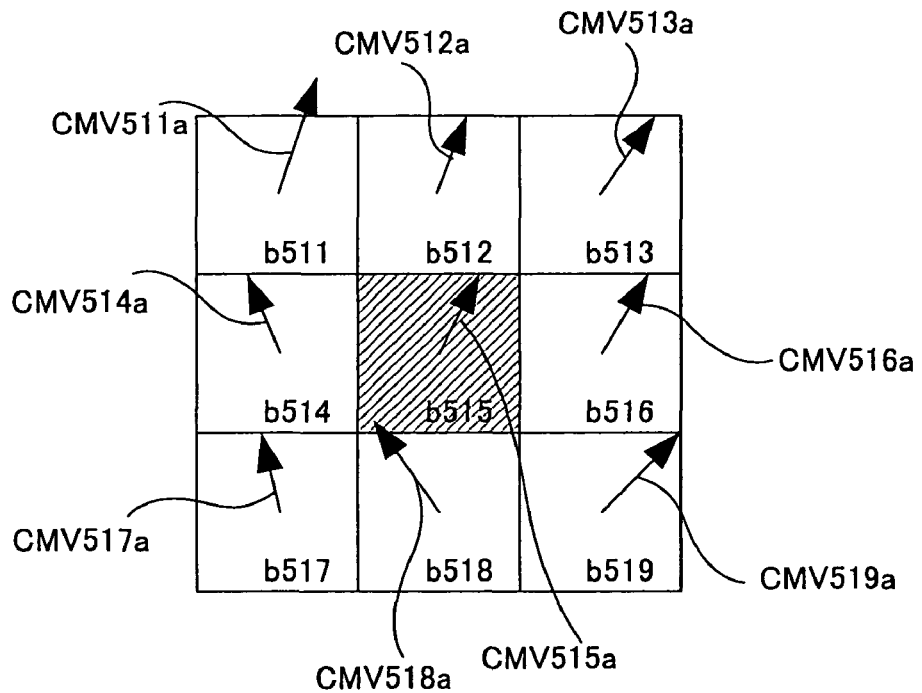

This will be described with reference to FIG. 9. FIG. 9(a) shows an example of encoding the B frame B42 of FIG. 4. For encoding the B frame B42 in the image signal d210, based on values calculated from the motion vectors detected between the P frame P44 and the I frame I41, vectors V511a through V519a and V511b through V519b for blocks b511 through b519 on the B frame B42 in two directions can be calculated (see FIG. 9(a)). Herein, a method for deriving the vectors V511a through V519a and V511b through V519b from the motion vectors detected between the P frame P44 and the I frame I41 are similar to that described in the above embodiment as a method for deriving the interpolation motion vectors. In FIG. 9, the vectors V511b through V519b are not illustrated since they are treated with the same process as the vectors V511a through V519a.

Then, a vector derived for each of the blocks is further treated with a smoothing process or the like using a vector derived for a next block to derive an interpolation motion vector for each of the blocks. For example, interpolation motion vectors CMV515a and CMV515b for the block b515 are calculated by subjecting the vectors of the surrounding blocks, the vectors V511a through V519a and V511b through V519b, to a smoothing filter, a median filter, or a weighted smoothing filter, for example (see FIG. 9(b)). The number of the surrounding blocks does not have to be around eight.

Similar effects can be achieved by smoothing the motion vectors detected between the P frame P44 and the I frame I41, and dividing the smoothed motion vectors internally or externally to calculate the interpolation motion vectors.

The encoding device 11 uses the calculated interpolation motion vectors to calculate the vector differences and the residual information described in the above embodiment and encode those as additional information.

Alternatively, the vector differences and the residual information may not be encoded as the additional information. Rather, the interpolation method or the smoothing method may be encoded as additional information.

The decoding device 12 calculates an interpolation motion vector for each of the blocks from the decoded P frame P44 and the I frame I41. Then, decoding of the blocks is performed using the interpolation motion vectors and the additional information.

When the vector differences and the residual information are not included in the additional information, the interpolation motion vectors are regarded as the motion vectors of the blocks to perform decoding of the blocks of the interpolation frame.

The interpolation motion vectors derived by the above-described procedure are effective in improving the picture quality of B frames created at the decoding device 12 when the residual information or the vector difference is not transmitted as the additional information, i.e., in transmission at a low bit rate. Specifically, in the interpolation motion vectors of the blocks calculated at the decoding device 12, spacial correlation with adjacent blocks is enhanced. Thus, it is effective in improving the precision of the B frames, particularly in reducing block distortions.

<<5>>

In the description of the above embodiment, the size of the block b51 of the B frame B42 is same as that of the blocks of the P frame P44 (see FIG. 4). However, the size of the block b51 is not limited to such size.

For example, the size of the block b51 of the B frame B42 may be one fourth that of the blocks of the P frame P44.

This allows a fine motion-compensation. Thus, the precision of the B frames created at the decoding device 12 can be improved.

(Regarding Additional Information)

<<6>>

The additional information d231 produced at the encoding device 11 may include default additional information which is encoded. This will be described with reference to FIGS. 10 and 11.

(6-1)

Figure 10:
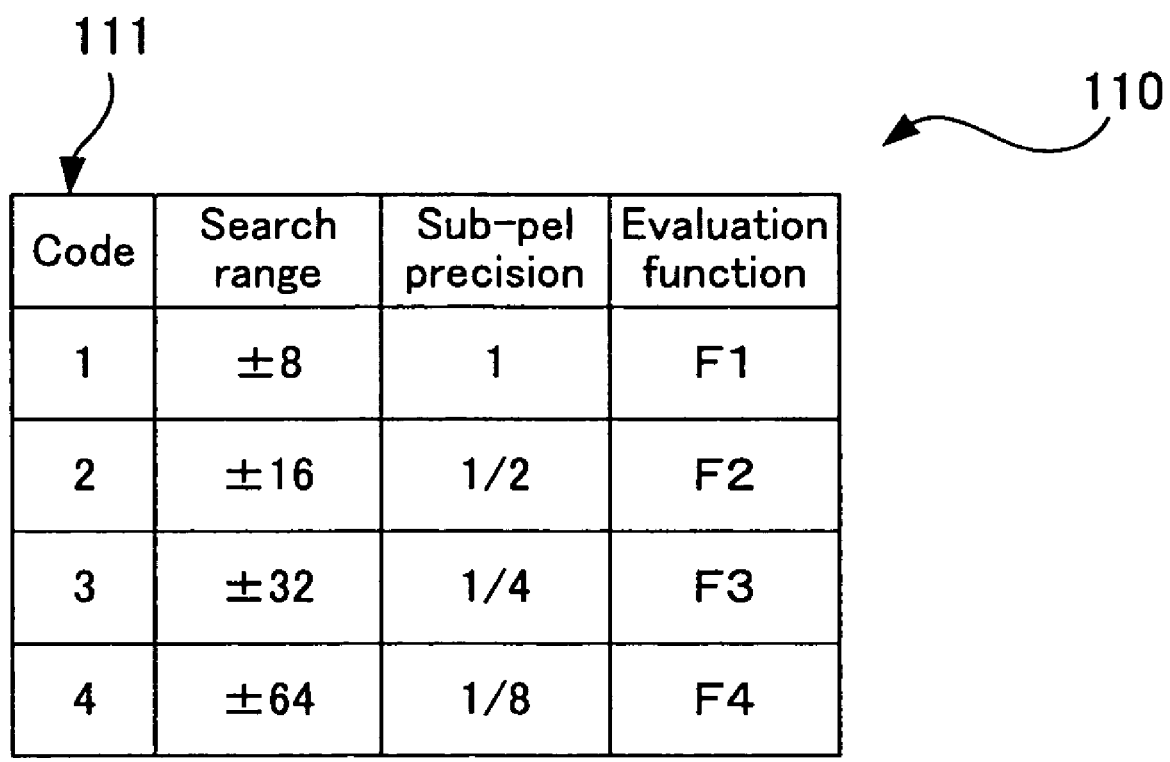
FIG. 10 shows a table 110 for specifying a combination of parameters of a motion detection method included in additional information d21.

FIG. 10 shows a table 110 for specifying a combination of parameters of the motion detection method included in the additional information d231. The table 110 stores a plurality of combinations of parameters regarding: the search range for motion detection (±8 pixels, ±16 pixels, ±32 pixels, and ±64 pixels); sub-pel precision (unit of an integer number of pixels, ½ pixel unit, ¼ pixel unit, and ⅛ pixel unit); and an evaluation function (F1 through F4: F1 through F4 represents evaluation functions such as SAD, SSD, and the like). The combination can be specified by code information 111. The encoding device 11 and the decoding device 12 share the common table 110.

The additional information d231 includes the motion detection method performed at the motion vector detection section 31 as the code information 111. The code information 111 is represented as information of a few bits. Thus, the amount of information of the additional information d231 can be further reduced.

Not only the motion detection method, but also the interpolation method may be represented by a table. FIG. 10 merely shows an example, and the effect of the present invention is not limited to this.

(6-2)

FIG. 11 shows a table 115 for specifying the combination of information included in the additional information d231. The table 115 includes a plurality of combinations of the information included in the additional information d231 as groups of profile information 116. In FIG. 11, the profile information 116 is specified by numbers of 1 through 4. A circle in the table 115 indicates that the corresponding information is included. A cross in the table 115 indicates that the corresponding information is not included. The encoding device 11 and the decoding device 12 share the common table 110.

It becomes possible for the decoding device 12 to recognize the combination of the information included in the additional information d252 obtained from the encoded image signal d211 by using the table 115. Thus, even when a part of the information included in the additional information d252 cannot be used, it is ensured that the decoding device 12 can skip the information by recognizing whether it is included or not. It is also ensured that the information included in the additional information d252 can be obtained. Thus, it becomes possible to prevent that the content of the additional information d252 is recognized erroneously.

FIG. 11 shows merely an example, and the effect of the present invention is not limited to this.

<<7>>

In the decoding device 12 (see FIG. 6), when the motion detection method specified by the additional information d252 obtained from the encoded image signal d211 cannot be performed, the motion vector detection section 79 may detect the motion vectors with another motion detection method which has been determined previously.

Figure 12:
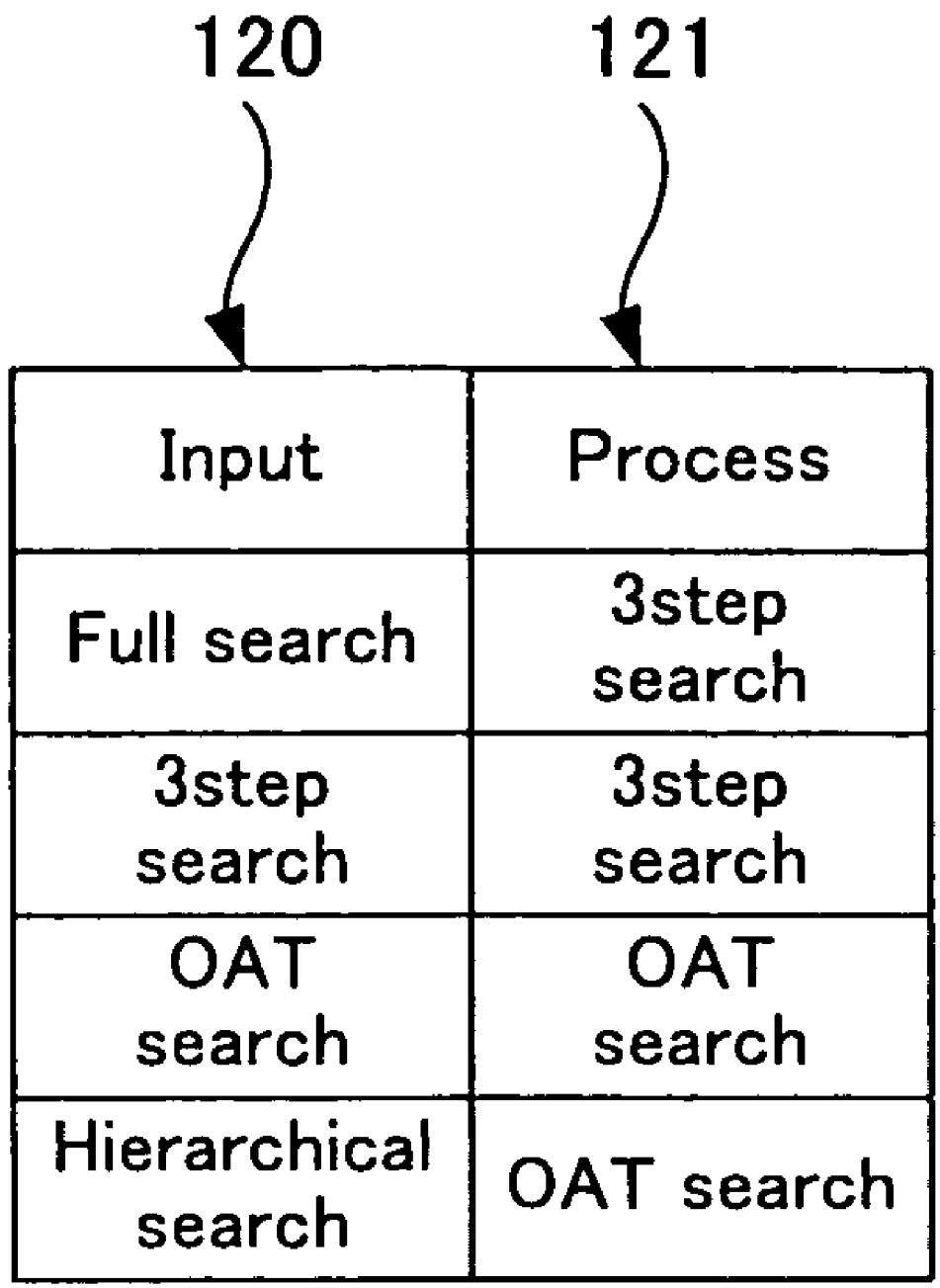
FIG. 12 shows correspondence between algorithms 120 for motion detection which are specified by additional information d252 and algorithms 121 for motion detection to be performed by a motion vector detection section 79.

FIG. 12 shows correspondence between algorithms 120 for motion detection which are specified by the additional information d252 and algorithms 121 for motion detection performed by the motion vector detection section 79.

Based on this, even when an algorithm 120 for motion detection which is specified by the additional information d252 cannot be performed, the motion vector detection section 79 runs another algorithm 121 for motion detection which can detect a motion vector as close as possible.

FIG. 12 shows merely an example of the correspondence, and the effect of the present invention is not limited to this.

<<8>>

In the encoding device 11 (see FIG. 2), when the information such as the motion detection method or the interpolation method is same as the predetermined default information, it may not be included in the additional information d231.

In such a case, when the information corresponding to the motion detection method or interpolation method is not included in the additional information d252, the decoding device 12 (see FIG. 6) uses default motion detection method or interpolation method shared with the encoding device 11 to create the interpolation frames.

In the encoding device 11 (see FIG. 2), if the motion vectors detected upon inter-coding of the image frames are available, the motion detection method may not be included in the additional information d231.

For example, if the motion vector MV48 to be detected for encoding the B frame B42 (see FIG. 4(a)) has already been detected when the P frame P44 is encoded, the motion vector between the P frame P44 and the I frame I41 is not detected again. For encoding the B frame B42, the encoding device 11 uses the motion vector detected when the P frame P44 is encoded.

In such a case, the decoding device 12 does not perform detection of the motion vector between the P frame P44 and the I frame I41 by the motion vector detection section 79 for creating the interpolation frame. The interpolation frame creation section 80 obtains motion vector used for encoding the P frame P44 from the decoding section 70, and uses this motion vector to decode the B frame B42.

<<9>>

In the above embodiment, the additional information d231 is produced for every interpolation frame. However, a part of the information included in the additional information d231 may be included in every stream of the image signal d210.

For example, the motion detection method, the interpolation method, and the like may be included in every stream of the image signal d210. In this way, it is no longer required to add the motion detection method and the interpolation method to every interpolation frame. Thus, the encoding efficiency is improved.

Further, at least a part of the additional information d231 may be included as a stream header of the image signal d210.

<<10>>

In the above embodiment, the additional information producing section 18 produces the additional information d231 in accordance with the size of the subtraction signal d220 which has been input. However, the additional information producing section 18 may produce the additional information d231 in accordance with the results of detection for the motion vectors between the P frame P44 and the I frame I41 by the motion vector detection section 31.

For example, when the motion vector at the motion vector detection section 31 is similar to, i.e., not largely different from, near motion vectors, additional information is produced. Alternatively, the additional information producing section 18 may produce the additional information d231 in accordance with the size of the subtraction signal d220 and the similarity of the motion vectors at the motion vector detection section 31 to near motion vectors.

In this way, the precision in creating the B frames can be improved.

<<11>>

In the above embodiment, when the residual information is incorporated into the additional information d231, the subtraction signal d220 is input to the additional information producing section 18. However, the quantized DCT coefficient d222 obtained by treating the subtraction signal d220 using the orthogonal transformation section 22 and the quantization section 23 may be input to the additional information producing section 18 when the residual information is incorporated into the additional information d231.

In such a case, the amount of information of the additional information d231 can be reduced.

Accordingly, in the decoding device 12, the quantized DCT coefficient d222 obtained by treating the subtraction signal d220 using the orthogonal transformation section 22 and the quantization section 23 in the additional information d252 output from the variable length decoding section 72 may be treated using the dequantization section 73 and the inverse orthogonal transformation section 74, and output to the interpolation frame creation section 80. In this way, the value of the subtraction signal d220 is given to the interpolation frame creation section 80.

(Regarding Decoding Section 70)

<<12>>

In the above embodiment, it is described that, when the encoded image signal d211 does not include the additional information d252, the decoding section 70 determines that the B frame B42 is encoded similarly to the conventional B frames (see FIG. 8, step S431). However, when the additional information d252 is not included, the decoding section 70 may create the interpolation frames using the image frames stored in the frame memory 76.

For example, the interpolation frame creation section 80 creates the interpolation frames using a predetermined method.

Herein, the predetermined method may be, for example, a method for detecting motion vectors between the image frames stored in the frame memory 76, obtaining the motion vectors of the interpolation frames and creating the interpolation frames, a method for using the motion vectors of the inter-coded image frames included in the encoded image signal d211, obtaining the motion vectors of the interpolation frames, and creating the interpolation frames.

(Regarding Encoding Device 11 and Decoding Device 12)

<<13>>

The sections in the encoding device 11 (see FIG. 2) and the decoding device 12 (see FIG. 6) may be integrated or may be separate. For example, in the encoding device 11, the encoding section 16, the motion compensation section 17, and additional information producing section 18 may be integrally provided, or may be separately provided as different devices. In the decoding device 12, the decoding section 70 and the frame outputting section 71 may be integrally provided, or may be separately provided as different devices.

<<14>>

The sections in the encoding device 11 (see FIG. 2) and the decoding device 12 (see FIG. 6) have been described that they are switched in frame units. However, they may be switched in block units. For example, operations of the switch 21 (see FIG. 2) and the switch 81 (see FIG. 6) may be performed based on determination in block units.

In such a case, processing the B frames in the additional information producing method as described with reference to FIG. 5 and the interpolation frame producing method as described with reference to FIG. 8 is performed in block units.

This allows selecting encoding and decoding methods suitable for each block. Thus, the picture quality of the B frames can be improved.

The methods described in the above embodiment and the variants can be combined as appropriate in block units, frame units, stream units and the like.

When switching is performed in block units, encoding of the B frames may be switched between the conventional encoding which does not produce additional information and the encoding according to the present invention which produces additional information.

Specifically, the switch 21 (or a control section which controls the switch 21 (not shown)) performs an encoding method selecting process as described below for each of the blocks forming the B frames. The encoding method selection process calculates the following Expression 1 for each of the candidates of the encoding method with respect to the input block.

$$J = D + \lambda \cdot R \quad \text{(Expression 1)}$$

Herein, J is a cost, D is distortion, $\lambda$, is a predetermined coefficient, and R is an encoding amount. More specifically, D is an error between a decoded image of the image encoded using the respective methods and the original image. R is an encoding amount when the respective methods are used for encoding, and is an encoding amount when encoding the quantized DCT coefficient d222, the motion vectors, the encoding mode, the additional information d231, and the like.

The encoding method selecting process is a process for selecting one of candidate encoding methods which will have the minimum value of J when Expression 1 is calculated.

Thus, the candidate encoding method which has the minimum result of Expression 1 is selected for every block, and encoding of the B frames which suppresses the distortion in decoding and reduces the amount of encoding at the same time can be realized.

The candidate encoding methods may be conventional encoding methods and the encoding methods described above. The conventional encoding methods include methods such as intra-coding, unidirectional prediction, bidirectional prediction, direct mode, and the like used as encoding methods for blocks forming B frames.

More specifically, the intra-coding and the unidirectional prediction are performed in a similar manner to those described as encoding of I frames and P frames. In the bidirectional prediction, the motion compensation section 17 (see FIG. 2) detects motion vectors of a B frame to the I frame and P frame which have already been locally decoded and stored in the frame memory 30. Then, the frame memory 30 creates motion-compensated B frame using the detected motion vectors. Then, the subtraction section 20 processes the B frame which forms the image signal d210 and the motion-compensated B frame, and outputs the subtraction signal d220. In the direct mode, the motion compensation section 17 (see FIG. 2) scales the motion vector of a block (anchor block) in the P frame which has already been locally decoded and stored in the frame memory 30, which is located at a position corresponding to the block of the B frame to be encoded, at the position of the B frame to calculate the motion vectors of the B frame to the I frame and the P frame. Then, the frame memory 30 creates motion-compensated B frame using the detected motion vectors. Then, the subtraction section 20 processes the B frame which forms the image signal d210 and the motion-compensated image signal d210, and outputs the subtraction signal d220.

When a conventional method is selected as the encoding method for the B frame, the switch 21 is turned to the orthogonal transformation section 22, and the subtraction signal d220 is input to the orthogonal transformation section 22. The detected motion vectors are input to the variable length coding section 24.

As described above, the conventional methods and the method of the present invention are switched for every block to further improve the encoding efficiency. For example, in the case where encoding by the direct mode is desirable among the conventional methods, the method of the present invention having encoding efficiency higher than the direct mode can be used.

More specifically, in the direct mode, motion vectors for the B frame to be encoded are not obtained, and, for example, the motion vectors of the P frame are used instead. In the direct mode, the encoding efficiency is improved by not encoding the motion vectors. Since the motion vectors of the P frame are used in the direct mode, a precision of the motion-compensated B frame is not sufficient, and the residual information may become large.

However, when the method of the present invention is used, the motion vectors for the B frame to be encoded are obtained. Thus, the sufficient precision of the motion compensated B frame can be achieved. Further, the obtained motion vectors do not have to be encoded, and the encoding efficiency can be improved as it is in the direct mode.

The switch 81 (see FIG. 6) can be operated in block units according to the encoded image signal d211 which have been encoded as described above.

Embodiment 2

An example of the application of the interpolation frame creating systems, the encoding devices, the decoding devices, the interpolation frame creating methods, and the interpolation frame creating programs, as well as a system using the same according to a second example of the present invention are described with reference to FIGS. 13 to 16.

Figure 13:
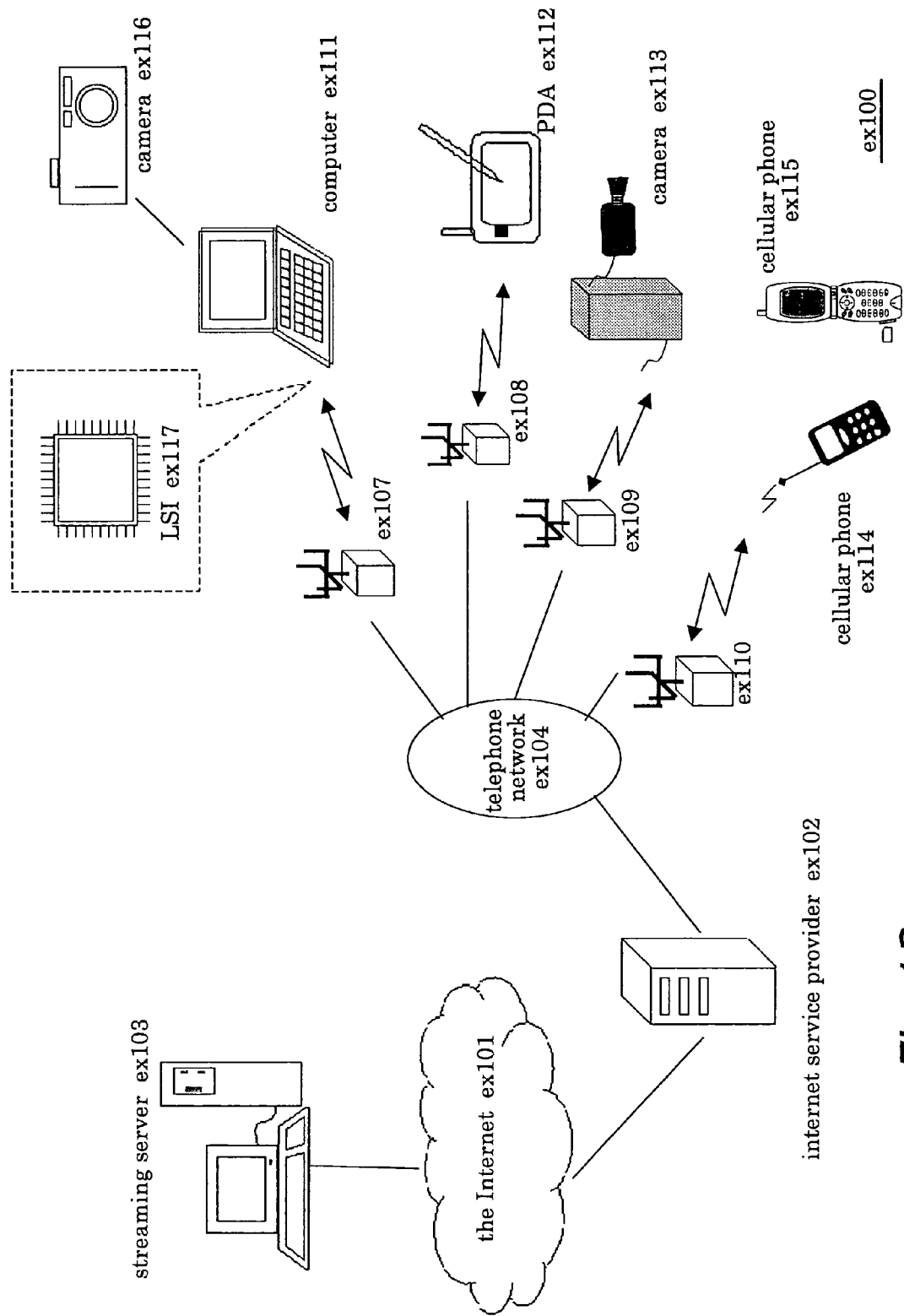
FIG. 13 is a block diagram illustrating the entire structure of a content providing system.

FIG. 13 is a block diagram showing an overall structure of a content providing system ex100 that realizes a content delivering service. An area where a communication service is provided is divided into cells of a desired size, and base stations ex107-ex110 that are fixed radio stations are provided in the cells.

This content providing system ex100 includes a computer ex111, a personal digital assistant (PDA) ex112, a camera ex113, a cellular phone ex114, a cellular phone with camera ex115 and other equipment that are connected to the Internet ex101 for example via an internet service provider ex102, a telephone network ex104 and base stations ex107-ex110.

However, the content providing system ex100 can adopt any combination for connection without being limited to the combination shown in FIG. 13. In addition, each of the devices can be connected directly to the telephone network ex104 without the base stations ex107-ex110 that are fixed radio stations.

The camera ex113 is a device such as a digital video camera that can obtain a moving image. In addition, the cellular phone may be any type of PDC (Personal Digital Communications) method, CDMA (Code Division Multiple Access) method, W-CDMA (Wideband-Code Division Multiple Access) method, or GSM (Global System for Mobile Communications) method, or a cellular phone of PHS (Personal Handyphone System).

In addition, the streaming server ex103 is connected to the camera ex113 via the base station ex109 and the telephone network ex104, so that live delivery can be performed on the basis of coded data transmitted by a user of the camera ex113. The coding process of the obtained data may be performed by the camera ex113 or by a server for transmitting data. In addition, the moving image data obtained by the camera ex116 may be transmitted to the streaming server ex103 via the computer ex111. The camera ex116 is a device that can take a still image like a digital camera and a moving image. In this case, coding of the moving image data may be performed by the camera ex116 or by the computer ex111. In addition, the coding process may be performed by an LSI ex117 in the computer ex111 or the camera ex116. Note that it is possible to incorporate software for coding and decoding images into a storage medium (a CD-ROM, a flexible disk, a hard disk or the like) that is a recording medium readable by the computer ex111. Furthermore, the cellular phone with camera ex115 may transmit the moving image data. In this case, the moving image data is coded by the LSI in the cellular phone ex115.

In this content providing system ex100, content (for example, a moving image of a music concert) that the user is recording with the camera ex113 or the camera ex116 are coded as shown in the above-described embodiments and transmitted to the streaming server ex103, while the streaming server ex103 delivers a stream of the content data to a client who made a request. The client may be the computer ex111, the PDA ex112, the camera ex113, the cellular phone ex114 or the like that can decode the coded data. Thus, in the content providing system ex100, the client can receive and reproduce the coded data. The system can realize personal broadcasting when the client receives, decodes and reproduces the stream in real time.

To encode or decode the content, the interpolation frame creating systems, the encoding devices, the decoding devices, the interpolation frame creating methods, and the interpolation frame creating programs may be used. For example, the computer ex111, the PDA ex112, the camera ex113, the cellular phone ex114 or the like may be provided with the encoding devices, the decoding devices, execute the interpolation frame creating methods, and the interpolation frame creating programs, and make up the interpolation frame creating systems as a whole.

An example regarding a cellular phone will now be described.

Figure 14:
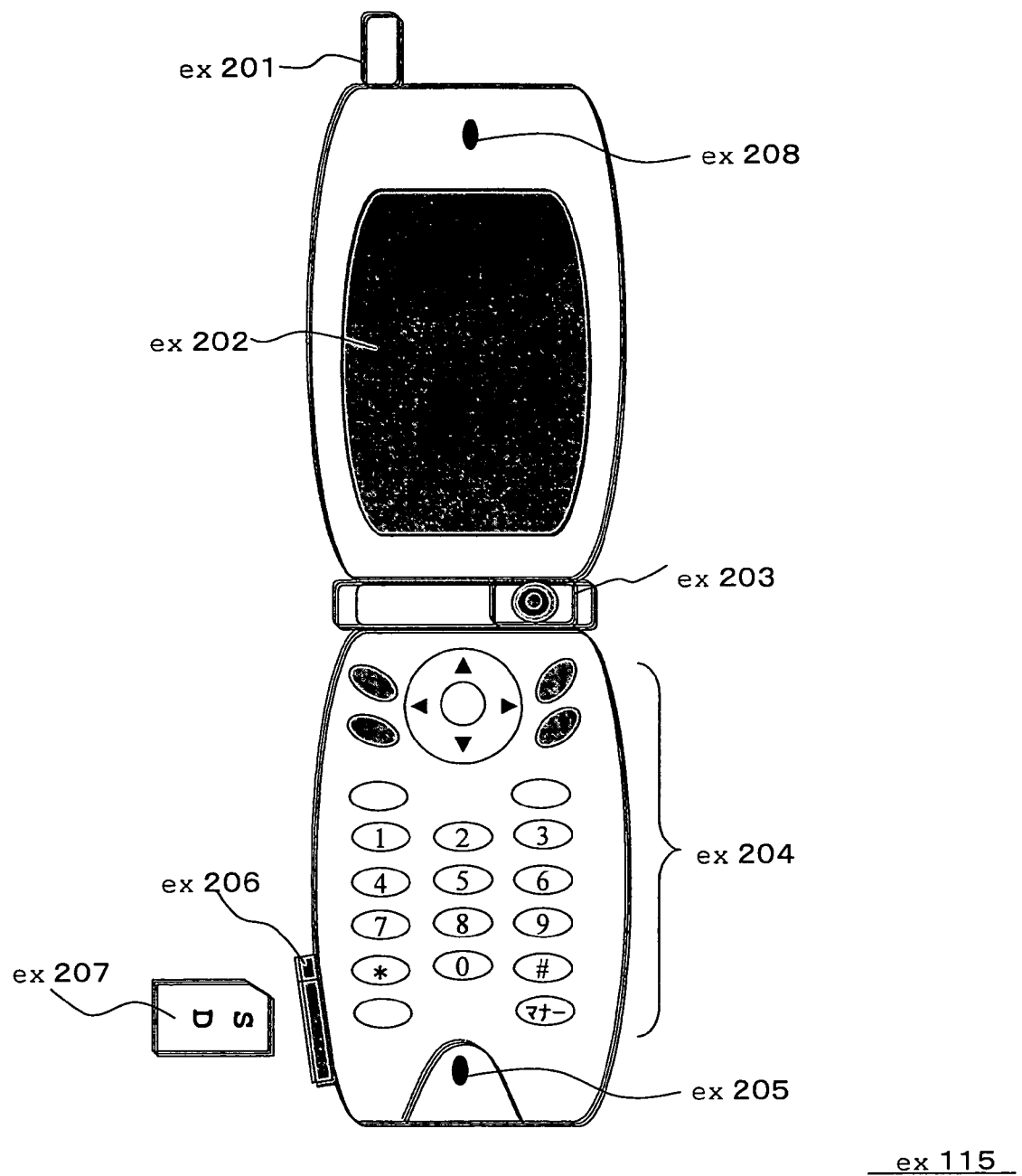
FIG. 14 shows an exemplary cellular phone including an interpolation frame creating device of the present invention.

FIG. 14 shows the cellular phone ex115 that utilizes the encoding devices and the decoding devices of the present invention. The cellular phone ex115 includes an antenna ex201 for transmitting and receiving radio waves with the base station ex110, a camera portion ex203 such as a CCD camera that can take a still image, a display portion ex202 such as a liquid crystal display for displaying images obtained by the camera portion ex203 or images received by the antenna ex201 after the image data are decoded, a main body portion including a group of operating keys ex204, a sound output portion ex208 such as a speaker for producing sounds, a sound input portion ex205 such as a microphone for receiving sounds, a recording medium ex207 for storing coded data or decoded data such as data of taken moving images or still images, data of received e-mails, moving images or still images, and a slot portion ex206 that enables the recording medium ex207 to be attached to the cellular phone ex115. The recording medium ex207 such as an SD card includes a plastic case housing a flash memory element that is one type of EEPROM (Electrically Erasable and Programmable Read Only Memory) nonvolatile memory that is electronically rewritable and erasable.

Furthermore, the cellular phone ex115 will be described with reference to FIG. 15. The cellular phone ex115 includes a main controller portion ex311 for controlling each portion of the main body portion having the display portion ex202 and the operating keys ex204, a power source circuit portion ex310, an operational input controller portion ex304, an image coding portion ex312, a camera interface portion ex303, an LCD (Liquid Crystal Display) controller portion ex302, an image decoding portion ex309, a multiplex separation portion ex308, a recording and reproduction portion ex307, a modem circuit portion ex306 and a sound processing portion ex305, which are connected to each other via a synchronizing bus ex313.

When the user turns on a clear and power key, the power source circuit portion ex310 supplies power from a battery pack to each portion so that the digital cellular phone with camera ex115 is activated.

The cellular phone ex115 converts a sound signal collected by the sound input portion ex205 during a sound communication mode into digital sound data by the sound processing portion ex305 under control of the main controller portion ex311 that includes a CPU, a ROM and a RAM. The digital sound data are processed by the modem circuit portion ex306 as a spectrum spreading process and are processed by the transmission and reception circuit portion ex301 as a digital to analog conversion process and a frequency conversion process. After that, the data are transmitted via the antenna ex201. In addition, the cellular phone ex115 amplifies a signal that is received by the antenna ex201 during the sound communication mode and performs the frequency conversion process and an analog to digital conversion process on the data, which is processed by the modem circuit portion ex306 as a spectrum inverse spreading process and is converted into a analog sound signal by the sound processing portion ex305. After that, the analog sound signal is delivered by the sound output portion ex208.

Furthermore, when transmitting electronic mail during a data communication mode, text data of the electronic mail are entered by using the operating keys ex204 of the main body portion and are given to the main controller portion ex311 via the operational input controller portion ex304. The main controller portion ex311 performs the spectrum spreading process on the text data by the modem circuit portion ex306 and performs the digital to analog conversion process and the frequency conversion process by the transmission and reception circuit portion ex301. After that, the data are transmitted to the base station ex110 via the antenna ex201.

When transmitting image data during the data communication mode, the image data obtained by the camera portion ex203 are supplied to the image coding portion ex312 via the camera interface portion ex303. In addition, if the image data are not transmitted, it is possible to display the image data obtained by the camera portion ex203 directly by the display portion ex202 via the camera interface portion ex303 and an LCD controller portion ex302.

The image coding portion ex312 converts the image data supplied from the camera portion ex203 into the coded image data by compressing and coding the data, and the coded image data are supplied to the multiplex separation portion ex308. In addition, the cellular phone ex115 collects sounds by the sound input portion ex205 while the camera portion ex203 is taking the image, and the digital sound data is supplied from the sound processing portion ex305 to the multiplex separation portion ex308.

The multiplex separation portion ex308 performs multiplexing of the coded image data supplied from the image coding portion ex312 and the sound data supplied from the sound processing portion ex305 by a predetermined method. Multiplexed data obtained as a result are processed by the modem circuit portion ex306 as a spectrum spreading process and are processed by the transmission and reception circuit portion ex301 as a digital to analog conversion process and a frequency conversion process. After that, the data are transmitted via the antenna ex201.

When receiving moving image file data that are linked to a web page during the data communication mode, a signal received from the base station ex110 via the antenna ex201 is processed by the modem circuit portion ex306 as a spectrum inverse spreading process. Multiplexed data obtained as a result are supplied to the multiplex separation portion ex308.

In addition, in order to decode multiplexed data received via the antenna ex201, the multiplex separation portion ex308 separates a coded bit stream of image data in the multiplexed data from a coded bit stream of sound data. Then, the multiplex separation portion ex308 supplies the coded image data to the image decoding portion ex309 via the synchronizing bus ex313 and supplies the sound data to the sound processing portion ex305.

Next, the image decoding portion ex309 generates reproduction moving image data by decoding the coded bit stream of the image data and supplies the data to the display portion ex202 via the LCD controller portion ex302. Thus, the moving image data included in a moving image file that is linked to a home page can be displayed. In this case, the sound processing portion ex305 converts the sound data into an analog sound signal, which is supplied to the sound output portion ex208. Thus, sound data included in the moving image file that is linked to a home page can be reproduced.

Note that the image coding portion ex312 may be provided with the encoding device shown in the above-described embodiments and the image decoding portion ex309 may be provided with the decoding device shown in the above-described embodiments. In this case, a common structure between the encoding device 11 shown in FIG. 6 and the decoding device 12 may share the same hardware. More specifically, the frame memories, the motion vector detection sections, dequantization section, or inverse orthogonal transformation sections may respectively share the same hardware.

Figure 16:
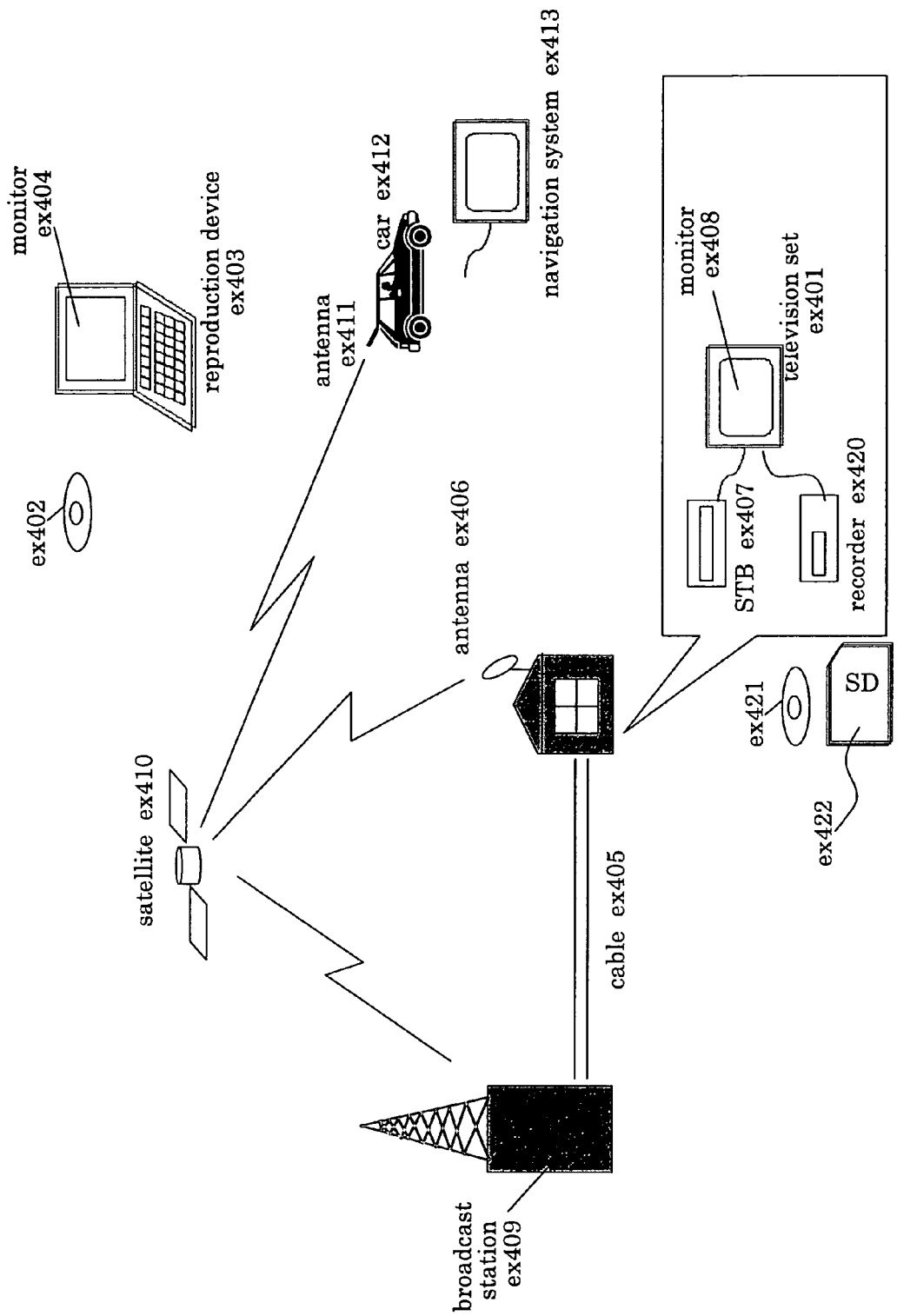
FIG. 16 is a diagram showing an exemplary digital broadcasting system.

Note that the present invention is not limited to the example of the system described above. Digital broadcasting by satellite or terrestrial signals has been a recent topic of discussion. As shown in FIG. 16, the interpolation frame creating systems, the encoding devices, the decoding devices, the interpolation frame creating methods, and the interpolation frame creating programs of the present invention can be incorporated into the digital broadcasting system, too.

More specifically, in a broadcast station ex409, a coded bit stream of image information is sent to a communication or a broadcasting satellite ex410 via a radio wave. The broadcasting satellite ex410 that received the coded bit stream of image information sends radio waves for broadcasting. These radio waves are received by an antenna ex406 of a house equipped with a satellite broadcasting reception facility, and a device such as a television set (a receiver) ex401 or a set top box (STB) ex407 decodes the coded bit stream and reproduces the same. In addition, the television set (the receiver) ex401 or the set top box (STB) ex407 may be provided with the encoding devices or the decoding devices shown in the above-described embodiments, use the interpolation frame creating methods shown in the above-described embodiments or execute the interpolation frame creating programs shown in the above-described embodiments. In addition, a reproduction device ex403 for reading and decoding a coded bit stream that is recorded on a storage medium ex402 such as a CD or a DVD that is a recording medium may be equipped with the encoding devices, the decoding devices, the interpolation frame creating methods, and the interpolation frame creating programs shown in the above-described embodiments. In this case, the reproduced image signal and text track are displayed on a monitor ex404. In addition, it is possible to mount the encoding devices, the decoding devices, the interpolation frame creating methods, and the interpolation frame creating programs shown in the above-described embodiments, in a set top box ex407 that is connected to a cable ex405 for a cable television or the antenna ex406 for a satellite or surface wave broadcasting, so that the image can be reproduced on a monitor ex408 of the television set. In this case, it is possible to incorporate the encoding devices or the decoding devices shown in the above-described embodiments not into the set top box but into the television set. In addition, it is possible that a car ex412 equipped with an antenna ex411 receives a signal from the broadcasting satellite ex410 or the base station ex107 and reproduces the moving image on a display of a navigation system ex413 in the car ex412.

Furthermore, it is possible to encode the image signal and record the encoded image signal in a recording medium. As a specific example, there is a recorder ex420 such as a DVD recorder for recording image signals on a DVD disk ex421 or a disk recorder for recording image signals on a hard disk. Furthermore, it is possible to record on an SD card ex422. In addition, in case that the recorder ex420 includes the decoding devices of the present invention, it is possible to reproduce image signals recorded on a DVD disk ex421 or a SD card ex422 via the image signal processing device, so as to display on the monitor ex408.

Figure 15:
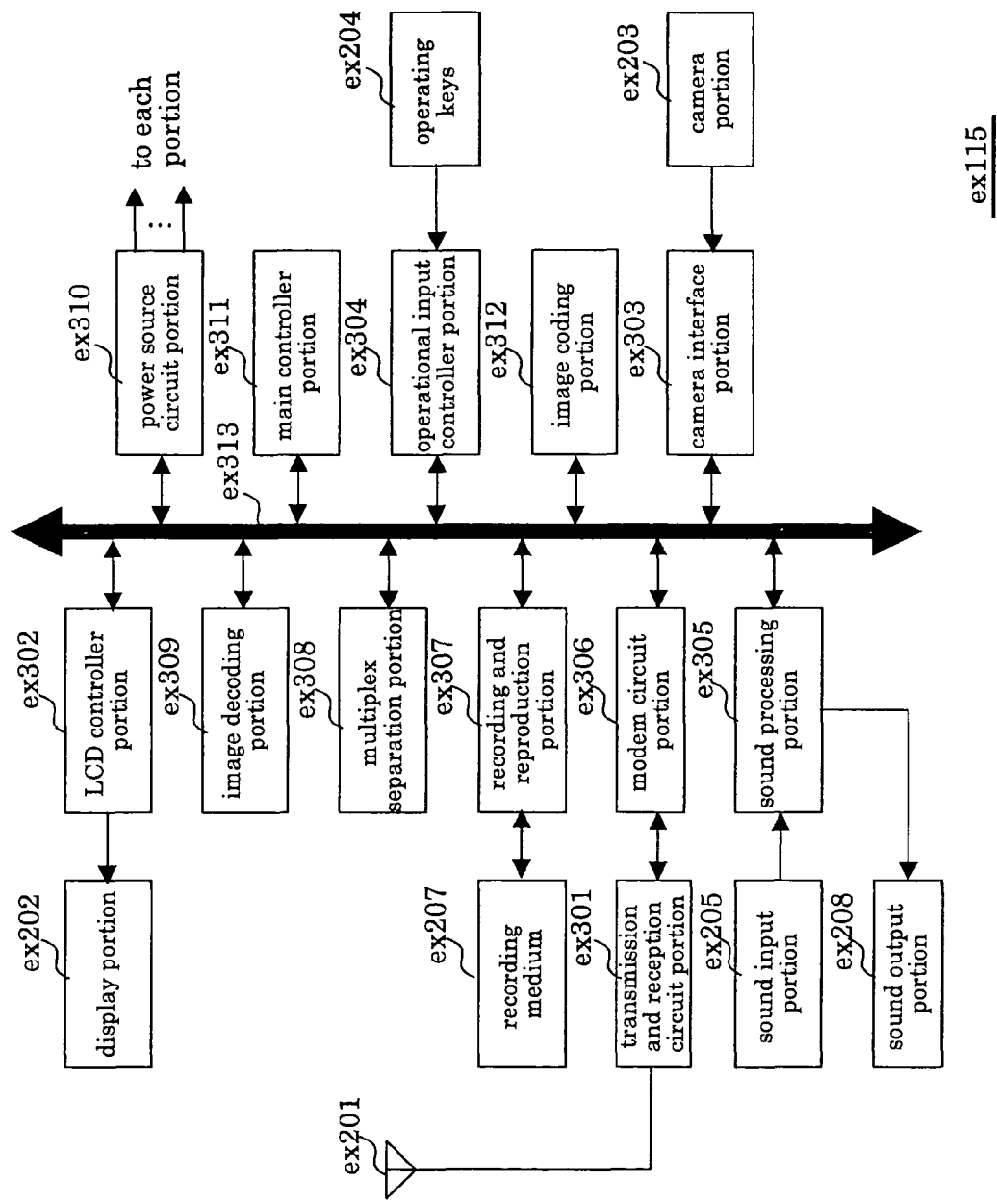
FIG. 15 is a block diagram illustrating a structure of the cellular phone.

Note that in the structure of the navigation system ex413 shown in FIG. 15, the camera portion ex203, the camera interface portion ex303 and the image coding portion ex312 can be omitted. This can be also applied to the computer ex111 and the television set (the receiver) ex401.

In addition, the terminal device such as the cellular phone ex114 may include three types of assemblies. A first type is a transmission and reception terminal having both the coder and the decoder, a second type is a transmission terminal having only a coder and a third type is a reception terminal having only a decoder.

Thus, the interpolation frame creating systems, the encoding devices, the decoding devices, the interpolation frame creating methods, and the interpolation frame creating programs shown in the above-described embodiments can be used for any device and system described above, so that effects described above can be obtained.

Note that each functional block of the encoding devices or the decoding devices shown in block diagrams are typically realized as an LSI that is an integrated circuit. These may be one chip individually, and also may be one tip as a part of them or as a whole.

For example, the functional blocks in FIG. 2 may be on the same chip. In this situation, the frame memory 30 may be externally connected with the chip.

In addition, the functional blocks in FIG. 6 may be on the same chip. In this situation, the frame memory 76 may be externally connected with the chip. The decoding section 70 and the frame outputting section 71 may be on the other chip. In this situation, the frame memory 76 may be externally connected with the decoding section 70.

The LSI may be referred to as an IC, a system LSI, a super LSI or an ultra LSI in accordance with the degree of integration.

In addition, a method for integrating circuits is not limited to an LSI but it may be realized by an application specific integrated circuit or a versatile processing unit. It is possible to use an FPGA (Field Programmable Gate Array) that is programmable after the LSI is produced or a silicon configurable processor that can restructure connection or setting of circuit cells in the LSI.

Furthermore, if another technique for integrating circuits rather than the LSI appears with the progress of semiconductor technology, then that technique may be utilized for integrating the functional blocks. Biotechnology has the potential for such technology.

In addition, in the image signal processing devices of the above embodiments, all of or a part of the process of each functional block may be realized by utilizing programs. In this case, CPUs of the image signal processing devices, for example, perform the process. Furthermore, the programs for the processes are stored in the hard disc devices or the ROMs of the image signal processing devices, and are read out to the ROMs or the RAMS of the image signal processing devises so as to be performed.

INDUSTRIAL APPLICABILITY

The decoding device, the encoding device, the interpolation frame creating system, the integrated circuit device, the decoding program and the encoding program according to the present invention can be applied to a decoding device, an encoding device, an interpolation frame creating system, an integrated circuit device, a decoding program and an encoding program which have to create interpolation frames at a high precision with an encoding efficiency being improved.

What is claimed is:

1. A decoding device, comprising:
   a decoding unit operable to decode an encoded image signal obtained by encoding image frames of an image signal and by encoding additional information for creating an interpolation frame for interpolating the image frames based on a first motion vector that is a motion vector between the image frames, so as to output decoded image frames of the image signal and decoded additional information;
   a motion vector detection unit operable to detect a second motion vector, which is a motion vector between the image frames of the encoded image signal decoded, based on (1) the decoded additional information output from the decoding unit and (2) the decoded image frames output from the decoding unit; and
   an interpolation frame creation unit operable to create an interpolation frame, considering the detected second motion vector as the first motion vector, such that the created interpolation frame is created based on the second motion vector, the decoded image frames output from the decoding unit, and the decoded additional information output from the decoding unit,
   wherein the interpolation frame creation unit obtains an interpolation motion vector from the second motion vector based on a ratio between (1) a distance in a time axis direction between the decoded image frames and (2) a distance in a time axis direction from a position of one of the decoded image frames to an interpolation position of the interpolation frame for interpolating the image frames, and creates the interpolation frame based on the interpolation motion vector and the decoded image frames,
   wherein, (A) when the additional information includes (i) an interpolation method for the interpolation frame with respect to the image frames, (ii) a motion detection method for detecting the first motion vector, and (iii) profile information specifying a combination of information that is related to the interpolation method and the motion detection method and that is included in the additional information, the interpolation frame creation unit specifies information included in the additional information using the profile information and creates the interpolation frame based on the specified information included in the additional information, and
   wherein, (B) when the additional information further includes at least one of (i) residual information of the interpolation frame and an image frame corresponding to the interpolation frame, and (ii) a vector difference between a motion vector of the interpolation frame detected with respect to the image frames and a motion vector of the interpolation frame derived based on the first motion vector with respect to the image frames, and when the additional information further includes the profile information specifying a combination of information that is related to (1) the interpolation method, (2) the motion detection method, (3) the residual information, and (4) the vector difference, and that is included in the additional information, the interpolation frame creation unit specifies the information included in the additional information using the profile information and creates the interpolation frame based on the specified information included in the additional information.

2. The decoding device according to claim 1, wherein:
   the motion detection method is included in the additional information as code information for specifying a combination of parameters of motion detection; and
   the motion vector detection unit detects the second motion vector based on the parameters of the motion detection specified by the code information.

3. The decoding device according to claim 1, wherein, when the motion detection method included in the additional information cannot be performed, the motion vector detection unit detects the second motion vector using a predetermined motion detection method determined in accordance with the motion detection method included in the additional information.

4. The decoding device according to claim 1, wherein the additional information is information produced for every interpolation frame.

5. The decoding device according to claim 1, wherein the motion detection method included in the additional information is information produced for every stream of the encoded image signal.

6. The decoding device according to claim 1, wherein, when the additional information is not included in the encoded image signal, the interpolation frame creation unit creates the interpolation frame based on the decoded image frames.

7. An encoding device, comprising:
   a first motion vector detection unit operable to detect a first motion vector, which is a motion vector between image frames of an image signal;
   an additional information production unit operable to produce additional information for creating an interpolation frame from the image frames and creating a motion vector for the interpolation frame, the motion vector being derived from the first motion vector based on a ratio between a distance in terms of time between the image frames and a distance in terms of time to an interpolation position of the interpolation frame, based on the first motion vector and the image frames; and an encoding unit operable to encode the image frames and the additional information, wherein the additional information includes (i) an interpolation method for the interpolation frame with respect to the image frames, (ii) a motion detection method for detecting the first motion vector, and (iii) profile information specifying a combination of information that is related to the interpolation method and the motion detection method and that is included in the additional information, wherein, when a difference between an image frame obtained by a motion compensation processing unit using the first motion vector and an image frame to be processed is equal to or greater than a predetermined threshold, the additional information further includes at least one of (i) residual information of the interpolation frame and an image frame corresponding to the interpolation frame, and (ii) a vector difference between a motion vector of the interpolation frame detected with respect to the image frames and a motion vector of the interpolation frame derived based on the first motion vector with respect to the image frames, and wherein the profile information specifies a combination of information that is related to (1) the interpolation method, (2) the motion detection method, (3) the residual information, and (4) the vector difference, and that is included in the additional information.

8. The encoding device according to claim 7, wherein the motion detection method is included in the additional information as code information for specifying a combination of parameters of motion detection.

9. The encoding device according to claim 7, wherein the additional information is information produced for every interpolation frame.

10. The encoding device according to claim 7, wherein the motion detection method is included in the additional information as header information of a stream of the image signal.

11. The encoding device according to claim 7, wherein the profile information is included in the additional information as header information of a stream of the image signal.

12. The encoding device according to claim 7, wherein, when a residual between the interpolation frame created based on the image frames and the image signal corresponding to the interpolation frame is small, the encoding unit does not encode the additional information.

13. An interpolation frame creating system for creating an interpolation frame for interpolating image frames of an image signal, the interpolation frame creating system comprising:

a first motion vector detection unit operable to detect a first motion vector, which is a motion vector between the image frames of the image signal;

an additional information production unit operable to produce additional information for creating the interpolation frame from the image frames and creating a motion vector for the interpolation frame, the motion vector being derived from the first motion vector based on a ratio between a distance in terms of time between the image frames and a distance in terms of time to an interpolation position of the interpolation frame, based on the first motion vector and the image frames;

an encoding unit operable to encode the image frames and the additional information;

a decoding unit operable to decode the encoded image frames and the encoded additional information, so as to output decoded image frames of the image signal and decoded additional information;

a second motion vector detection unit operable to detect a second motion vector, which is a motion vector between the image frames of the encoded image signal decoded, based on (1) the decoded additional information and (2) the decoded image frames output from the decoding unit; and an interpolation frame creation unit operable to create an interpolation frame, considering the detected second motion vector as the first motion vector, such that the created interpolation frame is created based on the second motion vector, the decoded image frames output from the decoding unit, and the decoded additional information output from the decoding unit, wherein the interpolation frame creation unit obtains an interpolation motion vector from the second motion vector based on a ratio between (1) a distance in a time axis direction between the decoded image frames and (2) a distance in a time axis direction from a position of one of the decoded image frames to an interpolation position of the interpolation frame for interpolating the image frames, and creates the interpolation frame based on the interpolation motion vector and the decoded image frames, wherein, (A) when the additional information includes (i) an interpolation method for the interpolation frame with respect to the image frames, (ii) a motion detection method for detecting the first motion vector, and (iii) profile information specifying a combination of information that is related to the interpolation method and the motion detection method and that is included in the additional information, the interpolation frame creation unit specifies information included in the additional information using the profile information and creates the interpolation frame based on the specified information included in the additional information, and wherein, (B) when the additional information further includes at least one of (i) residual information of the interpolation frame and an image frame corresponding to the interpolation frame, and (ii) a vector difference between a motion vector of the interpolation frame detected with respect to the image frames and a motion vector of the interpolation frame derived based on the first motion vector with respect to the image frames, and when the additional information further includes the profile information specifying a combination of information that is related to (1) the interpolation method, (2) the motion detection method, (3) the residual information, and (4) the vector difference, and that is included in the additional information, the interpolation frame creation unit specifies the information included in the additional information using the profile information and creates the interpolation frame based on the specified information included in the additional information.

14. An integrated circuit device, comprising:

a decoding section operable to decode an encoded image signal obtained by encoding image frames of an image signal and by encoding additional information for creating an interpolation frame for interpolating the image frames based on a first motion vector that is a motion vector between the image frames, so as to output decoded image frames of the image signal and decoded additional information;

a motion vector detection section operable to detect a second motion vector, which is a motion vector between the image frames of the encoded image signal decoded, based on (1) the decoded additional information output from the decoding section and (2) the decoded image frames output from the decoding section; and an interpolation frame creation section operable to create an interpolation frame, considering the detected second motion vector as the first motion vector, such that the created interpolation frame is created based on the second motion vector, the decoded image frames output from the decoding section, and the decoded additional information output from the decoding section, wherein the interpolation frame creation section obtains an interpolation motion vector from the second motion vector based on a ratio between (1) a distance in a time axis direction between the decoded image frames and (2) a distance in a time axis direction from a position of one of the decoded image frames to an interpolation position of the interpolation frame for interpolating the image frames, and creates the interpolation frame based on the interpolation motion vector and the decoded image frames, wherein, (A) when the additional information includes (i) an interpolation method for the interpolation frame with respect to the image frames, (ii) a motion detection method for detecting the first motion vector, and (iii) profile information specifying a combination of information that is related to the interpolation method and the motion detection method and that is included in the additional information, the interpolation frame creation section specifies information included in the additional information using the profile information and creates the interpolation frame based on the specified information included in the additional information, and wherein, (B) when the additional information further includes at least one of (i) residual information of the interpolation frame and an image frame corresponding to the interpolation frame, and (ii) a vector difference between a motion vector of the interpolation frame detected with respect to the image frames and a motion vector of the interpolation frame derived based on the first motion vector with respect to the image frames, and when the additional information further includes the profile information specifying a combination of information that is related to (1) the interpolation method, (2) the motion detection method, (3) the residual information, and (4) the vector difference, and that is included in the additional information, the interpolation frame creation section specifies the information included in the additional information using the profile information and creates the interpolation frame based on the specified information included in the additional information.

15. An integrated circuit device, comprising:

a first motion vector detection section operable to detect a first motion vector, which is a motion vector between image frames of an image signal;

an additional information producing section operable to produce additional information for creating an interpolation frame from the image frames and creating a motion vector for the interpolation frame, the motion vector being derived from the first motion vector based on a ratio between a distance in terms of time between the image frames and a distance in terms of time to an interpolation position of the interpolation frame, based on the first motion vector and the image frames; and an encoding section operable to encode the image frames and the additional information, wherein the additional information includes (i) an interpolation method for the interpolation frame with respect to the image frames, (ii) a motion detection method for detecting the first motion vector, and (iii) profile information specifying a combination of information that is related to the interpolation method and the motion detection method and that is included in the additional information, wherein, when a difference between an image frame obtained by a motion compensation processing section using the first motion vector and an image frame to be processed is equal to or greater than a predetermined threshold, the additional information further includes at least one of (i) residual information of the interpolation frame and an image frame corresponding to the interpolation frame, and (ii) a vector difference between a motion vector of the interpolation frame detected with respect to the image frames and a motion vector of the interpolation frame derived based on the first motion vector with respect to the image frames, and wherein the profile information specifies a combination of information that is related to (1) the interpolation method, (2) the motion detection method, (3) the residual information, and (4) the vector difference, and that is included in the additional information.

16. A non-transitory computer-readable recording medium having a decoding program recorded thereon, the decoding program causing a computer to execute a decoding method comprising:

a decoding step of decoding an encoded image signal obtained by encoding image frames of an image signal and by encoding additional information for creating an interpolation frame for interpolating the image frames based on a first motion vector that is a motion vector between the image frames, so as to output decoded image frames of the image signal and decoded additional information;

a motion vector detection step of detecting a second motion vector, which is a motion vector between the image frames of the encoded image signal decoded, based on (1) the decoded additional information output from the decoding step and (2) the decoded image frames output from the decoding step; and an interpolation frame creation step of creating an interpolation frame, considering the detected second motion vector as the first motion vector, such that the created interpolation frame is created based on the second motion vector, the decoded image frames output from the decoding step, and the decoded additional information output from the decoding step, wherein the interpolation frame creation step obtains an interpolation motion vector from the second motion vector based on a ratio between (1) a distance in a time axis direction between the decoded image frames and (2) a distance in a time axis direction from a position of one of the decoded image frames to an interpolation position of the interpolation frame for interpolating the image frames, and creates the interpolation frame based on the interpolation motion vector and the decoded image frames, wherein, (A) when the additional information includes (i) an interpolation method for the interpolation frame with respect to the image frames, (ii) a motion detection method for detecting the first motion vector, and (iii) profile information specifying a combination of information that is related to the interpolation method and the motion detection method and that is included in the additional information, the interpolation frame creation step specifies information included in the additional information using the profile information and creates the interpolation frame based on the specified information included in the additional information, and wherein, (B) when the additional information further includes at least one of (i) residual information of the interpolation frame and an image frame corresponding to the interpolation frame, and (ii) a vector difference between a motion vector of the interpolation frame detected with respect to the image frames and a motion vector of the interpolation frame derived based on the first motion vector with respect to the image frames, and when the additional information further includes the profile information specifying a combination of information that is related to (1) the interpolation method, (2) the motion detection method, (3) the residual information, and (4) the vector difference, and that is included in the additional information, the interpolation frame creation step specifies the information included in the additional information using the profile information and creates the interpolation frame based on the specified information included in the additional information.

17. A non-transitory computer-readable recording medium having an encoding program recorded thereon, the encoding program causing a computer to execute an encoding method comprising:

a first motion vector detection step of detecting a first motion vector, which is a motion vector between image frames of an image signal;

an additional information production step of producing additional information for creating an interpolation frame from the image frames and creating a motion vector for the interpolation frame, the motion vector being derived from the first motion vector based on a ratio between a distance in terms of time between the image frames and a distance in terms of time to an interpolation position of the interpolation frame, based on the first motion vector and the image frames; and an encoding step of encoding the image frames and the additional information, wherein the additional information includes (i) an interpolation method for the interpolation frame with respect to the image frames, (ii) a motion detection method for detecting the first motion vector, and (iii) profile information specifying a combination of information that is related to the interpolation method and the motion detection method and that is included in the additional information, wherein, when a difference between an image frame obtained by a motion compensation processing step using the first motion vector and an image frame to be processed is equal to or greater than a predetermined threshold, the additional information further includes at least one of (i) residual information of the interpolation frame and an image frame corresponding to the interpolation frame, and (ii) a vector difference between a motion vector of the interpolation frame detected with respect to the image frames and a motion vector of the interpolation frame derived based on the first motion vector with respect to the image frames, and wherein the profile information specifies a combination of information that is related to (1) the interpolation method, (2) the motion detection method, (3) the residual information, and (4) the vector difference, and that is included in the additional information.

* * * * *